United States Patent
Horigome

(10) Patent No.: US 11,957,983 B2
(45) Date of Patent: *Apr. 16, 2024

(54) GAME DEVICE, GAME METHOD AND GAME PROGRAM

(71) Applicant: GREE, Inc., Tokyo (JP)

(72) Inventor: Satoshi Horigome, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,646

(22) Filed: Feb. 22, 2023

(65) Prior Publication Data

US 2023/0191260 A1     Jun. 22, 2023

Related U.S. Application Data

(63) Continuation of application No. 17/484,177, filed on Sep. 24, 2021, now Pat. No. 11,607,614, which is a
(Continued)

(30) Foreign Application Priority Data

Feb. 25, 2019  (JP) ................................ 2019-031749

(51) Int. Cl.
    *A63F 13/69*     (2014.01)
(52) U.S. Cl.
    CPC .................... *A63F 13/69* (2014.09)
(58) Field of Classification Search
    CPC ........ A63F 13/69; A63F 13/35; A63F 13/822; A63F 13/825
    See application file for complete search history.

(56) References Cited

U.S. PATENT DOCUMENTS

| | | |
|---|---|---|
| 6,045,447 A | 4/2000 | Yoshizawa et al. |
| 2003/0032476 A1 | 2/2003 | Walker et al. |

(Continued)

FOREIGN PATENT DOCUMENTS

| | | |
|---|---|---|
| JP | 2013156743 A | 8/2013 |
| JP | 2016187627 A | 11/2016 |

(Continued)

OTHER PUBLICATIONS

Office Action dated Jun. 7, 2022, in connection with corresponding Japanese Application No. 2019-031749 (4 pp., including machine-generated English translation).

(Continued)

*Primary Examiner* — Kevin Y Kim
(74) *Attorney, Agent, or Firm* — Maier & Maier, PLLC

(57) ABSTRACT

A game device for reducing the processing load of a redraw process, including a storage module storing game content information associated with identification information for one or more users, and a module for processing a lottery, in which multiple types of game contents may each be associated with an index value corresponding to the relative values of the types of game contents. The module for processing the lottery may include a module for executing redrawing that may execute new lottery processing for drawing, via the lottery, a type of game content that differs from game content drawn by a first lottery process, when the game content drawn by the first lottery process related to one user's identification information is associated with an index value which is equal to or greater than a predetermined standard value, and when said game content has a predetermined relationship with the game content information related to the user's identification information.

20 Claims, 12 Drawing Sheets

Related U.S. Application Data continuation of application No. 16/774,181, filed on Jan. 28, 2020, now Pat. No. 11,154,781.

(56) References Cited

U.S. PATENT DOCUMENTS

2006/0293103 A1    12/2006   Mendelsohn
2013/0196732 A1     8/2013   Oochi et al.

FOREIGN PATENT DOCUMENTS

| JP | 6284105 B1 | 2/2018 |
| JP | 6345866 B1 | 6/2018 |
| JP | 2018171310 A | 11/2018 |

OTHER PUBLICATIONS

Office Action dated Dec. 6, 2022, in corresponding Japanese Application No. 2019-031749, 6 pages.
Office Action dated Oct. 31, 2023, in corresponding Japanese Application No. 2022-212013; 9 pages.
Office Action issued on Feb. 20, 2024, in corresponding Japanese Application No. 2022-212013, 7 pages.

FIG.2

| USER ID | USER NAME | RANK | INFORMATION PERTAINING TO OWNED GAME CONTENT | INFORMATION PERTAINING TO USED GAME CONTENT | FRIEND INFORMATION |
|---|---|---|---|---|---|
| U01 | USER 01 | *** | *** | *** | *** |
| U02 | USER 02 | *** | *** | *** | *** |
| ... | ... | ... | ... | ... | ... |

FIG.3

| GAME CONTENT ID | GAME CONTENT NAME | RARITY | LEVEL | COST | HP | ATTACK POWER | RESTORATION POWER | ATTRIBUTION | INFORMATION PERTAINING TO EVOLUTION | INFORMATION PERTAINING TO STRENGTHENING | INFORMATION PERTAINING TO GAME FUNCTIONS |
|---|---|---|---|---|---|---|---|---|---|---|---|
| C01 | CHARACTER A1 | *** | *** | *** | *** | *** | *** | *** | *** | *** | *** |
|  | CHARACTER A2 | *** | *** | *** | *** | *** | *** | *** | *** | *** | *** |
| C02 | CHARACTER B | *** | *** | *** | *** | *** | *** | *** | *** | *** | *** |
| ... | ... | ... | ... | ... | ... | ... | ... | ... | ... | ... | ... |

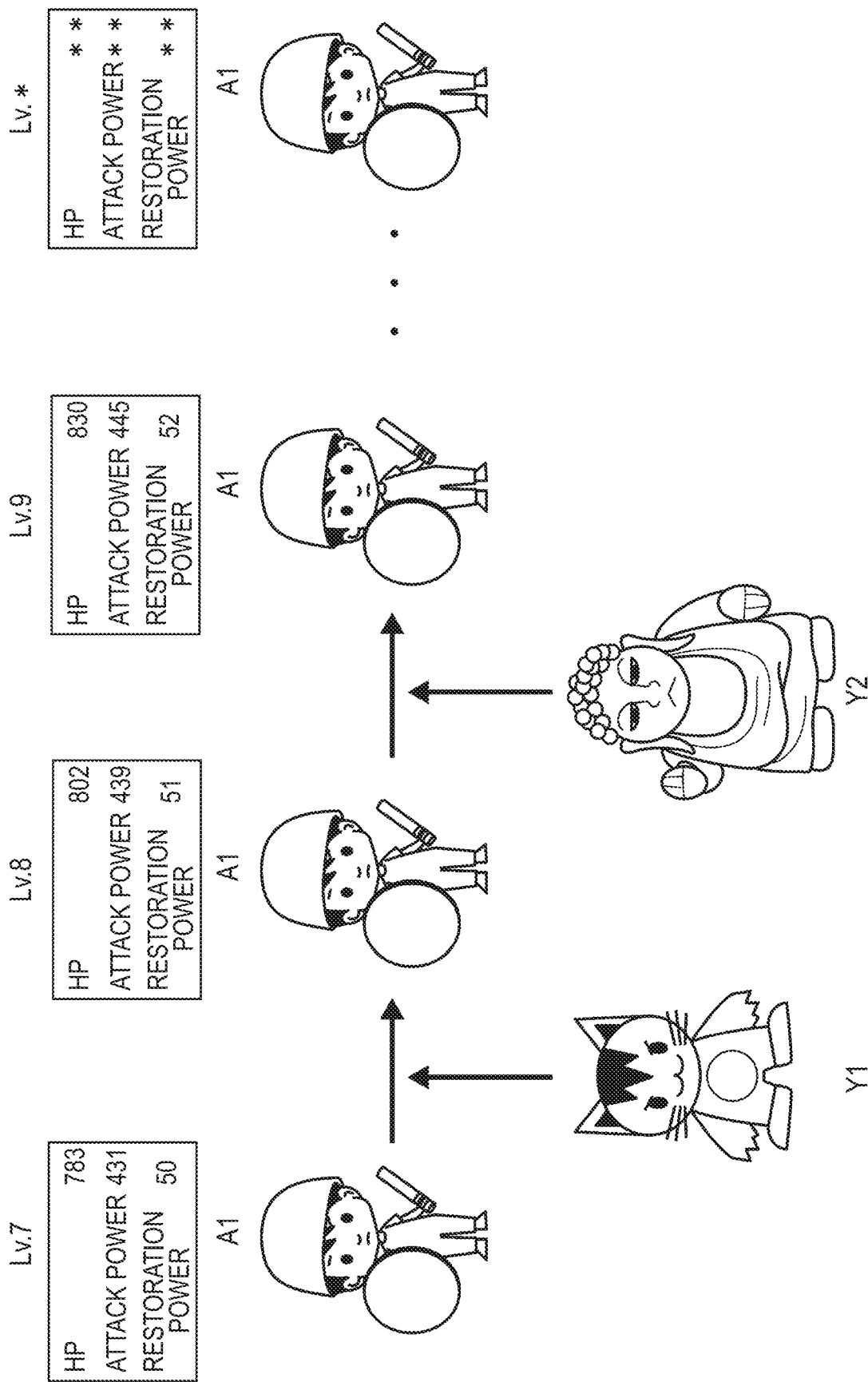

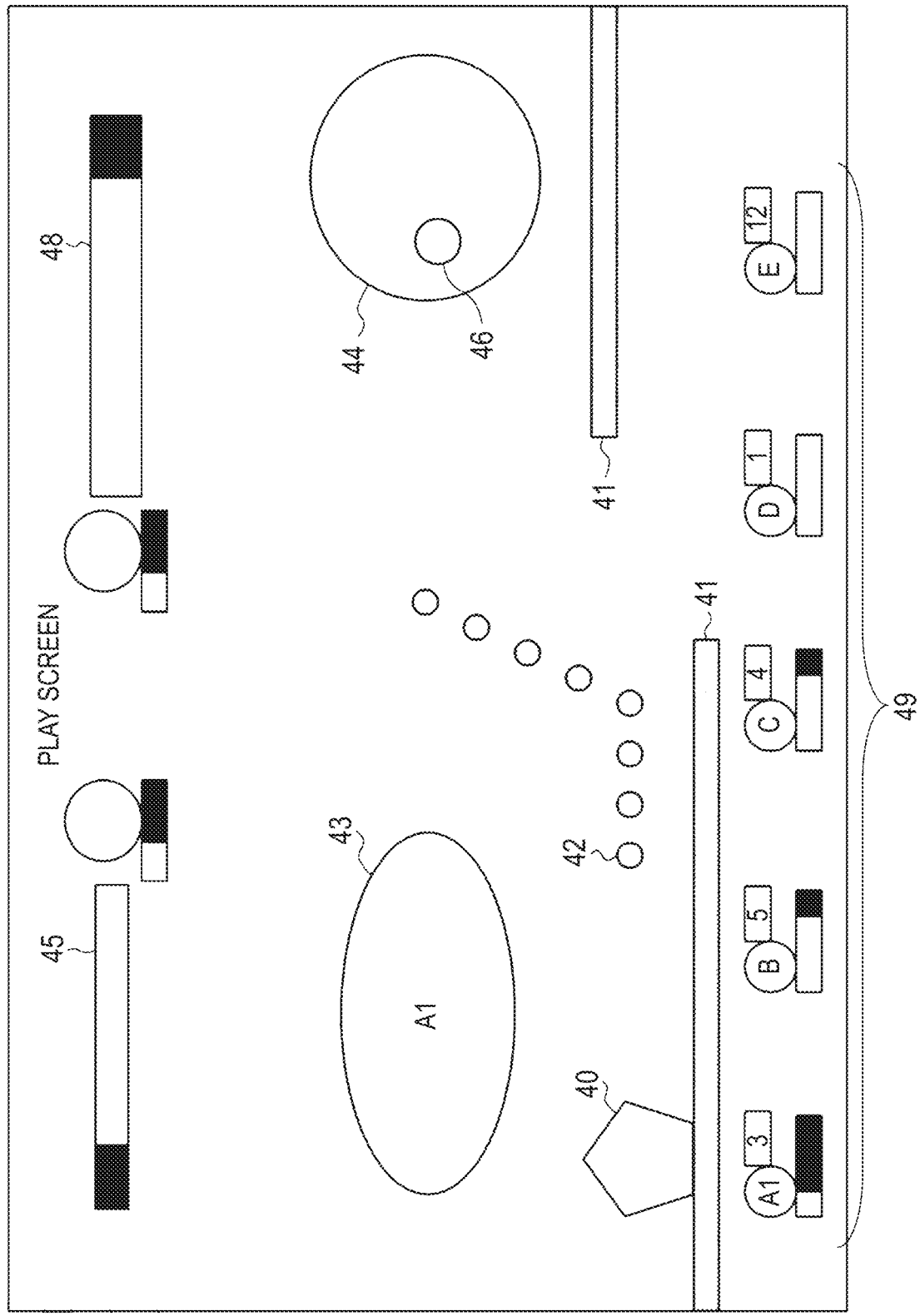

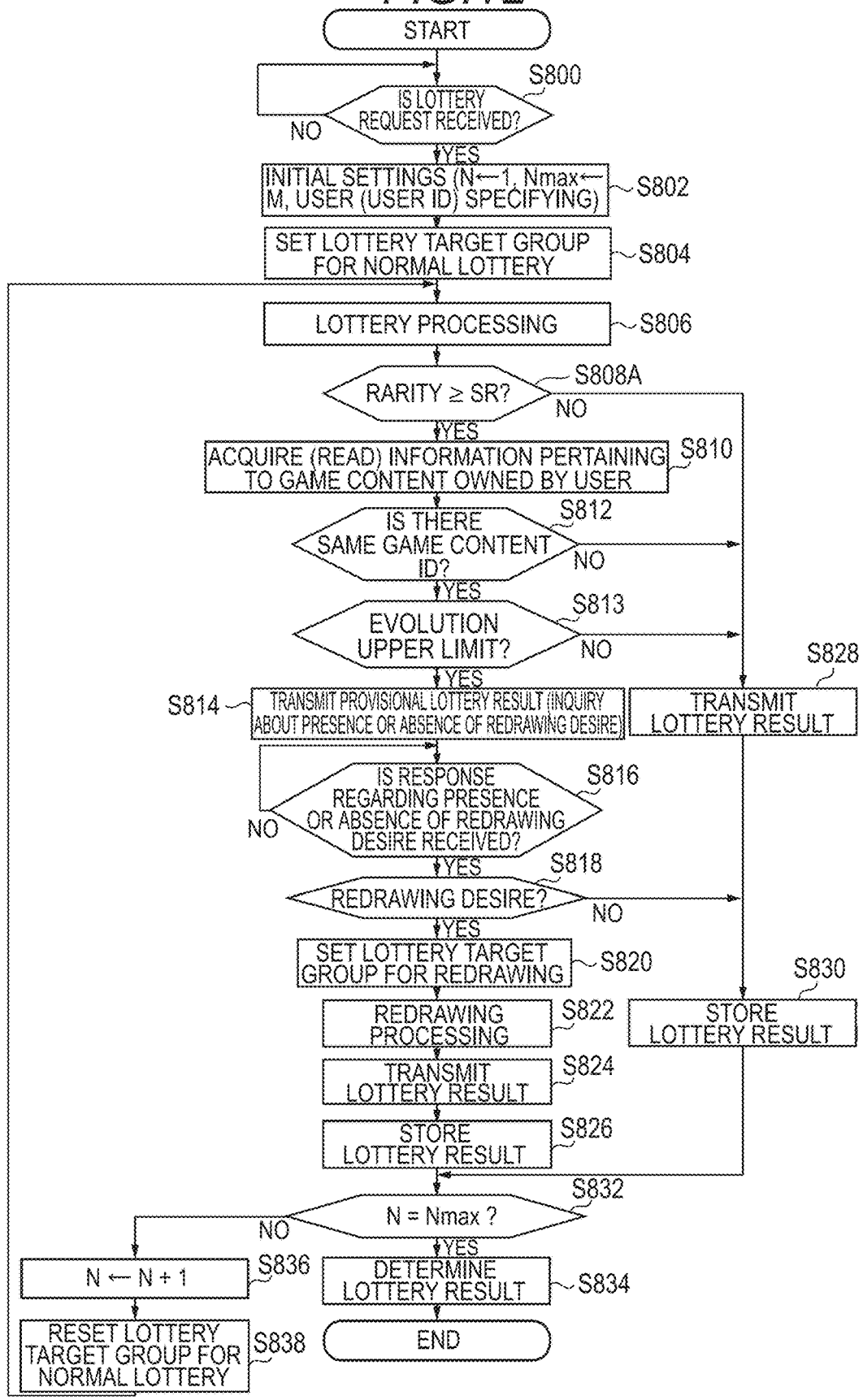

GAME DEVICE, GAME METHOD AND GAME PROGRAM

CROSS-REFERENCE TO RELATED APPLICATIONS

This application is a continuation of U.S. patent application Ser. No. 17/484,177, entitled "GAME DEVICE, GAME METHOD AND GAME PROGRAM," filed on Sep. 24, 2021, which claims priority from U.S. patent application Ser. No. 16/774,181, now U.S. Pat. No. 11,154,781, filed on Jan. 28, 2020, entitled "GAME DEVICE, GAME METHOD AND GAME PROGRAM," which in turn claims priority from Japanese Patent Application No. 2019-031749, filed on Feb. 25, 2019, the entire contents of which are hereby incorporated by reference.

FIELD

The present invention relates to a game device, a game method and a game program.

BACKGROUND

It is understood that a technique for a game system may be provided which includes a reception processing module which receives an acquisition request of a game content from a terminal device and a module for processing a lottery which conducts lottery processing for letting a user obtain game content when acquisition of the game content was requested.

Patent Literature 1, Japanese Patent Publication No. 2018-171310, provides such a technique.

SUMMARY

Technical Problem

If the game content drawn by the lottery processing is worthless for a user, giving the user an opportunity to redraw a lottery may be helpful from the viewpoint of being user friendly.

However, if a specification is such that redrawing a lottery is always possible when a user requests, processing may be increasingly overloaded due to the redrawing lotteries.

In view of the foregoing, it may be contemplated in an exemplary embodiment to provide a game content which is a higher value type for a user by redrawing a lottery while reducing the overloaded processing due to the lottery redrawing process.

Solution to Problem

According to an exemplary embodiment, it may be contemplated to provide a game device comprising a storage module storing game content information indicating one or more game contents corresponding to user identification information associated with each user identification information, and a module for processing a lottery newly corresponding to a game content drawn from multiple types of game contents to the user identification information associated with each user identification information based on the lottery processing, wherein the multiple types of game contents may be associated with an index value corresponding to a relative value between the multiple types of game contents respectively, and the module for processing the lottery includes a module for executing redrawing that executes new lottery processing for drawing a different type of game content from the game content drawn by the lottery processing of the game system when the game content drawn by the lottery processing of the game system related to a user identification information of the game system is associated with the index value indicating a high value equal to or higher than a predetermined standard, and the game content drawn by the lottery processing of the game system includes a predetermined relationship with respect to the game content information related to the user identification information of the game system and includes a game content changing module that associates the game content drawn by the new lottery processing instead of the game content drawn by the lottery processing of the game system with the user identification information of the game system when the new lottery processing is executed by the module for executing redrawing.

According to the aspect of the invention, it is possible to easily obtain a game content which is a higher value type for a user by redrawing a lottery while reducing the overloaded processing due to the lottery redrawing process.

BRIEF DESCRIPTION OF THE FIGURES

FIG. 2 is a diagram showing the information associated with a user.

FIG. 3 is a diagram showing the information associated with a game content.

FIG. 4B is an explanatory diagram of strengthening of the first game content.

FIG. 5 is a diagram showing an example of a play screen displayed on a terminal device.

FIG. 12 is a schematic flowchart showing yet another example of processing executed by a module for processing a lottery.

DETAILED DESCRIPTION OF THE EMBODIMENTS

Figure 1:
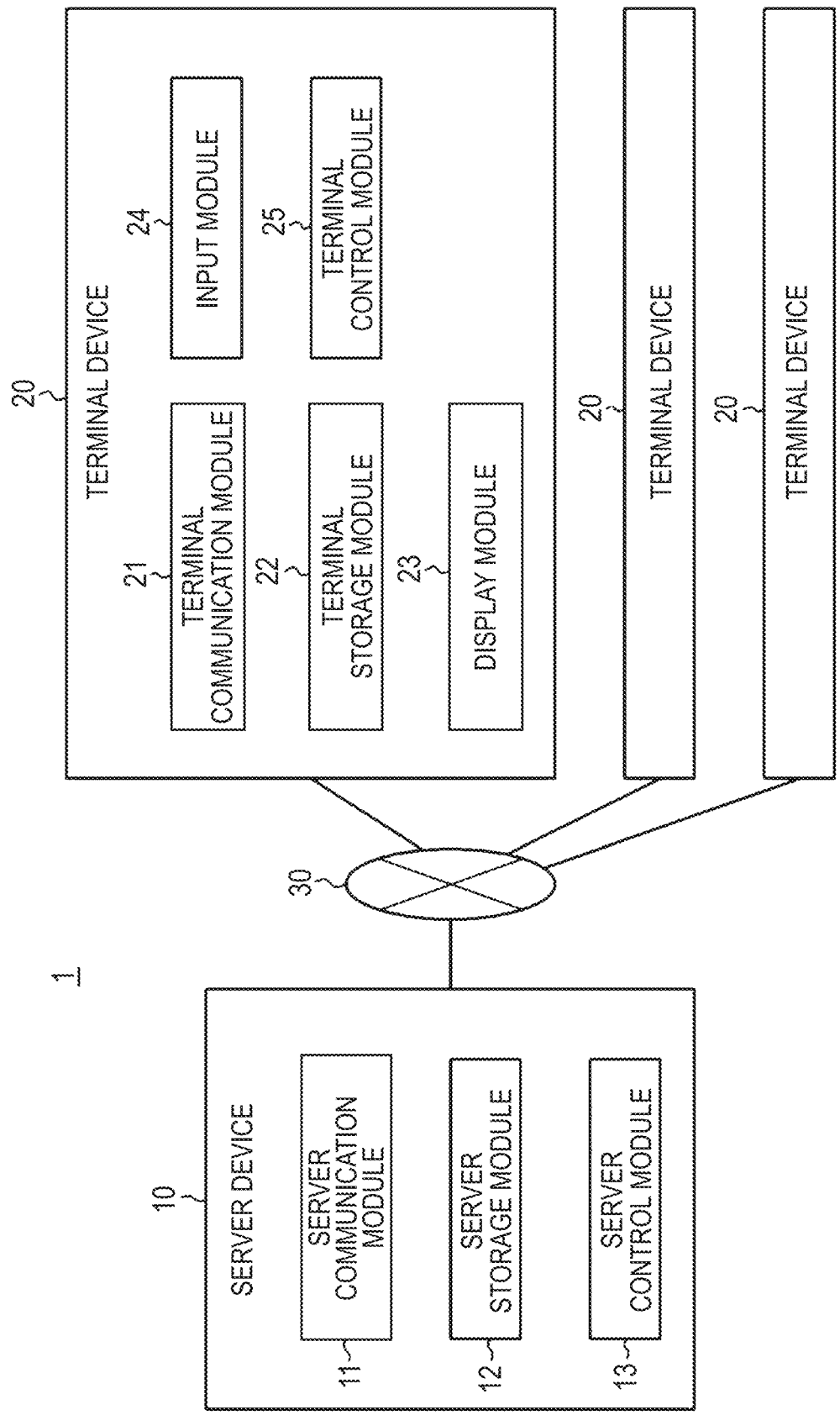
FIG. 1 is a block diagram of a game system according to an embodiment of the invention.

Hereinafter, each embodiment will be described in detail while referring to the drawings.

(Brief Overview of Game System)

A brief overview of a game system according to one exemplary embodiment will be described while referring to FIG. 1. The game system includes a server device 10, and one or more terminal devices 20. Since FIG. 1 is a simplified diagram, three terminal devices 20 may be shown, however, the number of the terminal devices 20 may be two or more.

The server device 10 is an information processing device such as a server managed by a game operator. The terminal device 20 is an information processing device used by a user, such as a mobile phone, a smart phone, a tablet terminal, PC (Personal Computer), or a game device. The terminal device 20 may be an executable device that allows applications of games according to an exemplary embodiment. The game applications may be received from a predetermined application distribution server to the terminal device 20 through a network 30 or may be stored in advance in a storage medium such as a storage device provided to the terminal device 20 or a readable memory card that the terminal device 20 can read. The server device 10 and the terminal device 20 may be transmissibly connected through the network 30. For example, the server device 10 and the terminal device 20 may coordinate with each other and execute a variety of processing pertaining to games.

The network 30 may include a radio communication network, internet, VPN (Virtual Private Network), WAN (Wide Area Network), a wired network, or any combination of these.

(Brief Overview of Games)

A brief overview of games according to an exemplary embodiment will be described. A game according to an exemplary embodiment may include one or more game parts. At least one game part out of the one or more game parts may be executed by using a game content.

A game content may be an instance of electronic data used in the game and may include an arbitrary content such as a card, an item, a point, a virtual currency, a ticket, a character, an avatar, and a parameter. Further, the game content may be game related information such as level information, status information, parameter information (such as physical power value and striking power) or capability information (such as skills, abilities, spells and jobs). In addition, the game content may be the electronic data that may be obtained, possessed, used, managed, exchanged, combined, enhanced, sold, disposed or granted by a user within a game, however, forms of use of the game contents may not be limited to the aspects described herein.

Hereinafter, except when explicitly described, "Owned game content of a user" may be defined as a game content corresponding to a game content owned by a user ID that uniquely identifies the user, "Game content granted to a user" may be defined as a game content corresponding to a user ID as an owned game content, and "User disposes of the owned game content" may be defined as eliminating the correspondence between the user ID and the owned game content. Further, "Consuming a game content owned by a user" may be defined as some effect or influence possibly occurring in the game responding to the elimination of the correspondence between the user ID and the owned game content, and "Selling a game content owned by a user" may be defined as eliminating the correspondence between the user ID and the owned game content and then correlating another game content (for example, a virtual currency or an item) to the user ID as an owned game content. Furthermore, "Transferring a game content owned by user A to user B" may be defined as eliminating the correspondence between the user ID of user A and the owned game content and then correlating the game content to the user ID of user B as the owned game content. Finally, "Preparing a game content" may be defined as prescribing or deciding at least one part of the information pertaining to the game content.

A game part may be a content that a user can play in a game and may include quests, missions, mini-games, a game content development, an enhancement, combinations, events to obtain a game content, exploratory events of virtual space and competition events with opponents (for example, other users, opponent characters and opponent buildings). One or more predetermined subjects (game subjects) may be set in each game part. For example, when the achievement of one or more game subjects that may be set in a game part played by a user is determined to be successful, a game content or equivalent may be granted to the user as a reward. Any subjects corresponding to contents of the game parts may be acceptable for game subjects, such as a subject of winning a match against an opponent character, a subject of achieving a goal line in a virtual space and a subject of a user's character not becoming a predetermined state (for example, an incapacitated state) until a predetermined time has passed. Further, achieving a specific subject (clear subject) in one or more game subjects that may be set in game parts may be referred as clearing a game part. When a user playing a game part may be successful on achieving a clear subject, the game part may be ended as a determination of clearing the game part.

One or more game parts may include game parts for a single player and game parts for multiple players. A game part for a single player may include a game part executed based on a user operation with respect to one terminal device 20 used by one user (for example, a game part for one person). A game part for a single player may be executed by one terminal device 20 alone or by one terminal device coordinating with the server device 10, for example. On the other hand, a game part for multiple players may include a game part common to two or more users (for example, a game part for a plurality of people) executed based on user operations with respect to two or more terminal devices 20 used by two or more users respectively. The game part common to two or more users may include a game part in which, for example, at least one part of a progression processing of the game part and at least one part of a processing result may be applied commonly to two or more users respectively. For instance, a game part for multiple players may be executed by coordinating two or more terminal devices 20 or by coordinating two or more terminal devices 20 and the server device 10. In addition, one game part may apply to both a single player and multiple players.

As an example, a game according to an exemplary embodiment may include a competition game part containing an action game element such as a side scrolling style action game and a competition game element fighting against an opponent using a game content. A user may select one or more game content to use for the competition game part from the game contents (owned game contents) owned by the user. Hereinafter, each game content used for the competition game part may be termed as the first game content. One or more of the first game contents may be termed collectively as a deck or team. An opponent may be a game content operated automatically such as an NPC (Non-Player Character), however, it may not be limited thereto. For example, an opponent may be a game content operated by another user. The number of opponents may be arbitrarily set in one competition game part.

A brief overview of a competition game part according to an exemplary embodiment will be described. A user playing the competition game part for a single player using the terminal device 20 can obtain, for example, predetermined items while operating a movable object arranged in the virtual space and avoiding obstacles. The movable object may correspond to a predetermined game content (the second game content). The second game content may include motorcycles, bicycles, people or other items. Game contents in the deck (the first game content) may conduct predetermined actions (for example, an attack against an opponent) based on the player earning the items. Damages to the opponent can be achieved by the actions of the first game content. Contrarily, the opponent conducts the predetermined actions (for example, attack against the user) at predetermined time intervals. Damages to the user can be achieved by actions of the opponent. Predetermined parameters may be set for the user and the opponent respectively to reduce the achieved damaged amount. When the parameter of the opponent is reduced to the predetermined value (for example, zero), it may be determined to be a victory of the user. On the other hand, when the parameter of the user is reduced to the predetermined value (for example, zero), it may be determined to be a defeat of the user. The competition game part may be ended when a victory or a defeat of the user is determined.

With regards to the game part for multiple players, in an exemplary embodiment two or more users may be fighting against a common opponent, but a game that is otherwise the same as the competition game part for the single player described above may be conducted. Specifically, each of two or more users may play the common competition game part using their own terminal device 20. Each of two or more users may respectively operate the second game content in the virtual space described above. A virtual space common to two or more users may be used or an independent virtual space for each user may be used. The first game content included in each deck of two or more users respectively may conduct the attack against the common opponent, for example. The parameters of the opponent described above may be commonly applied to two or more users. The parameter of the opponent may be synchronized between multiple terminal devices 20 used by two or more users respectively. When the parameter of the opponent is reduced to the predetermined value (for example, zero), it may be determined to be a victory of two or more users. On the other hand, when the parameter of each of two or more users is reduced to the predetermined value (for example, zero), it may be determined to be a defeat of two or more users. The competition game part may be ended when a victory or a defeat of two or more users is determined.

(Configuration of Server Device)

The configuration of the server device 10 will be described in detail. The server device 10 may be configured by a server computer. The server device 10 may function by coordinating multiple server computers.

The server device 10 may include a server communication module 11, a server storage module 12 and a server control module 13.

The server communication module 11 may communicate with external devices by wireless or cable network and may include an interface to transmit and receive the information. The server communication module 11 may include a wireless LAN (Local Area Network) communication module or a cable LAN communication module, for example. The server communication module 11 can transmit and receive the information with the terminal devices 20 through the network 30.

The server storage module 12 may include a primary storage device and a secondary storage device, for example. The server storage module 12 may include a semiconductor memory, a magnetic memory, optical memory, or an equivalent memory. The server storage module 12 may store multiple types of information and programs used for processing of the games. At least one part of the information and the programs stored in the server storage module 12 may be shared and synchronized with the terminal devices 20. Hereinafter, an example of information that the server storage module 12 may store may be described in detail.

(Information Pertaining to Users)

The server storage module 12 may store the information pertaining to each of the multiple users. The information pertaining to the users will be described while referring to FIG. 2. The information pertaining to two users respectively may be shown in FIG. 2. The information pertaining to a user may include the various types of information specific to the user. For example, the information pertaining to the user may include a user ID, a user name, a rank, information pertaining to the owned game contents, information pertaining to a used game content and friend information. Multiple users respectively, the information pertaining to the owned game contents as well as the information pertaining to the used game contents and the friend information may correspond to the information pertaining to the user.

The user ID may be the information uniquely identifying the user. Hereinafter, a user ID may be simply called as a user.

The user name may be the information identifying the name of the user. The user name may be different from the user ID and does not have to be uniquely identifying the user. The user name may be defined arbitrarily or may be exchangeable depending on the operations with respect to the terminal devices 20.

Rank may be a parameter showing proficiency of the user pertaining to the game. The rank value according to an exemplary embodiment may increase depending on a play of the game by the user. The higher the rank, the proficiency of the user pertaining to the game may be greater.

The information pertaining to the owned game content may include varieties of unique information in the game contents (the owned game contents) owned by the user in the game. If a game content is obtained by a user, the game content may be correlated with the user as the owned game content. The detail of the information pertaining to owned game content will be described later.

The information pertaining to the used game content may be the information showing the game content (the first game content) being used by a user in the competition game part. The first game content may be selected from the owned game contents. In the embodiment, a maximum of five game contents, for example, selected from one or more of the owned game contents may be corresponding to the user as the first game contents respectively. Therefore, it may be possible that one game content may be an owned game content and the first game content at the same time. The first game content may be selected automatically or depending on the operation of the user in the dedicated game part, for example. The dedicated game part may include a game part that may conduct organization or team organization. The maximum of five first game contents shown in the information pertaining to the used game content may be configured as one deck. The information pertaining to the used game content may include the information of multiple decks.

The friend information may show the user IDs of the friend relationships. For example, if user A may be friends with user B and user C, the friend information corresponding to user A may include the IDs of user B and user C. Further, the friendship can be achieved through a friend request or similar actions. As described, the friend information may include user IDs of other users corresponding between users in a one-way direction or bidirectionally. The users in the friend relationship can be communicable, for example, by sending and receiving messages in the game system. In addition to or exchanging with the friend information, the information identifying an affiliated group (for example, a guild) may be included in the information pertaining to the user.

The substance of the information pertaining to a user may not be limited to the description above. For example, the information pertaining to the user may further include the information showing the predetermined points held by the user in the game. The points may be consumed every time the user may play the game part. The consumption of the points may be different for each game part. The points may also be increased depending on the time passed or depending on the usage of the predetermined game content.

An example of the foregoing information pertaining to the owned game content will be described in detail while referring to FIG. 3. The information pertaining to two owned game contents corresponding to one user may be shown in FIG. 3. Examples of the information pertaining to each owned game content may include a game content ID, a game content name, rarity, a level, a cost, HP (Hit Point), an attack power, a restoration power, attribute, the information pertaining to the evolution of the game content, the information pertaining to the strengthening of the game content and the information pertaining to the game functions of the game content.

The game content ID may be the information uniquely identifying the game content. The game content ID may be stored in advance in the server storage module 12. Alternatively, the game content ID may be determined by the server device 10 when allowing a user to obtain a game content.

The game content name may be the information identifying the name of the game content. The game content name may be different from the game content ID and does not have to be uniquely identifying the game content. The initial value of the game content name may be stored in advance in the server storage module 12. The game content name may change depending on a play of the game by the user who obtained the game content.

Some parts or all of the first game contents in the embodiment allow step-by-step evolutions (changes of appearance) up to the predetermined upper limit. Hereinafter, a game content allowing step-by-step evolutions may be called a "game content capable of evolving." An example of the evolutions in the embodiment may be characterized as an effect involving an increased rarity. For the convenience of an explanation, a number at the end of a game content name herein may show the stages of the evolutions. For example, the game content "C01" shown in FIG. 3 may be a game content capable of evolving, and the game content name may be "Character A1" when the game content "C01" may not be evolved at all. On the other hand, when the game content "C01" may be evolved only one step, the game content name may be "Character A2." The number of the stages of the evolutions may be arbitrary and may be different for each game content capable of evolving. Further, the game content capable of evolving may be a part of all the first game content (for example, a corresponded rarity may be a game content different from SSR (double super rare) described later).

In addition, all of the first game contents in the embodiment may allow step-by-step strengthening (changes of appearance) up to the predetermined upper limit. Modifications may allow strengthening in only a part of the first game contents or may allow strengthening in the second game contents described later. Hereinafter, a game content allowing strengthening may be called a "game content capable of being strengthened."

Rarity may be information showing the degree of rarity of the game content (rare value). Specifically, the rarity corresponding to a game content may show the degree of difficulty of obtaining the game content (difficulty of getting a lottery), and a higher rarity herein may be characterized as more difficult to own. As an example, the rarity in the embodiment may not be described as numbers but categorized with terms such as N (normal), R (rare), SR (super rare) and SSR (double super rare). The SSR may be defined as the highest rarity.

In the games herein for example, if N (normal), R (rare), SR (super rare) and SSR (double super rare) correspond to the numbers of game contents types, which may be N pieces of N (NN), N pieces of R (NR), N pieces of SR (NSR) and N pieces of SSR (NSSR) respectively, the order of numbers becomes NN>NR>NSR>NSSR. The terms corresponding to the rarity may be diverse and types of the rarity may be different other than four stages. As an example in the embodiment, the number of NSSR may be defined as NSSR≥2.

Nonetheless, the rarity may be a different embodiment from the embodiment that may be decided depending on the difference in numbers of game content types. For example, the differences of the rarity may be attained by adjusting the providing probability for each game content type. In this case, if N (normal), R (rare), SR (super rare) and SSR (double super rare) correspond to the providing probability of game content types, PN, PR, PSR, PSSR respectively, even if NN=NR=NSR=NSSR, the similar rarity can be achieved by making the probability PN>PR>PSR>PSSR. Further, without making the numbers NN=NR=NSR=NSSR, it may be possible to attain similar rarity differences by adjusting the providing probability while varying the number of each game content type. For example, the numbers of game content types and the providing probability of each type may be adjusted to become NN×PN>NR×PR>NSR×PSR>NSSR×PSSR. Furthermore, the providing probability may be changed by every type and may be adjusted by every individual game content.

The level may be the information showing the degree of the growth of the game content. For example, the value of the level may be larger, then the degree of the growth of the game content may be larger. The value of the level in the embodiment may be increased depending on a game play of a user. Further, the level according to the first game content may be set so as the upper limit level may be set for every first game content. In this case, the upper limit level of the first game content may be set to become higher as the rarity becomes higher, for example. In addition, the upper limit level of the first game content may be allowed to be raised by specific strengthening (for example, breaking the limit).

The cost may be a parameter used for deciding the decks used in the competition game part. In the embodiment, within the range in which the total cost value of each first game content does not exceed the predetermined upper limit value, it may be possible to include maximum of five first game contents into one deck. The upper limit value may be increased depending on the enhancement of the rank of the user, for example.

The HP may be a parameter used for determining a victory or a defeat of a user in the competition game part. In the embodiment, the HP total of the first game content included in the deck may be used to determine the upper limit value at the time of initiation of the competition game part. Hereinafter, the HP total of all of the first game content included in the deck may be called, "Total HP of a user." When a damage may be given to a user by an attack of an opponent while playing the competition game part, for example, the total HP may be reduced depending on the amount of the damage. When a restoration item is obtained while playing the competition game part, for example, the total HP may be increased. When the total HP is reduced to a predetermined value (for example, zero), a defeat of the user may be determined. Therefore, the larger the HP of each first game content included in the deck, the more advantageous this is for the user. The HP value may be increased depending on the enhancement of the level.

The attack power may be the information contributed to the damage amount given to an opponent by an attack of the game content, for example. The larger the value of the attack power, the bigger the damage amount given to the opponent. Therefore, the larger the attack power of the game content, the more advantageous for the user. The value of the attack power may be increased depending on the enhancement of the level.

The restoration power may be a parameter used while playing the competition game part. In the embodiment, the total value of the restoration power of all of the first game content included in the deck may be used. Hereinafter, the total value of the restoration power of all of the first game content included in the deck may be called, "Total restoration power of a user." When a restoration item is obtained while playing the competition game part, for example, the total restoration power of the user may be increased. The larger the value of the total restoration power, the bigger the increased amount of the total HP. Therefore, the larger the restoration power of each game content included in the deck, the more advantageous for the user. The value of the restoration power may be increased depending on the enhancement of the level.

Within the parameters described above, the HP, the attack power and the restoration power may be the parameters showing the ability of a game content. Specifically, the ability of the game content becomes higher with the higher HP, the ability of the game content becomes higher with the higher attack power, and so forth. Further, if a specification may be such that the attack power or a similar item may be increased depending on the enhancement of the level, the level also becomes a parameter showing the ability of the game content. Regarding the foregoing game content capable of evolving, if a specification may be such that the ability becomes higher depending on the stages of the evolutions, the evolution stages (value of the evolutions) also becomes a parameter showing the ability of the game content.

Herein after, such parameters showing the abilities of the game content may be called, "Ability parameter."

The attribute may be the information showing the characteristic of a game content. The attribute may include multiple first attributes (for example, a fire characteristic, a tree characteristic and a water characteristic) showing the compatibility between game contents playing against each other. At least one of the first attributes from the multiple first attributes may be corresponding to one game content. For example, the damages that the fire characteristic game content can give against the tree characteristic game content may be larger than the normal state and against the water characteristic game content may be smaller than the normal state. Therefore, for example, the fire characteristic may be advantageous against the tree characteristic and disadvantageous against the water characteristic. The attribute may include multiple second attributes (for example, an attack characteristic, a restoration characteristic, a stamina characteristic, a balance characteristic, and similar characteristics) that do not affect the compatibility between the game contents playing against each other. At least one of the second attributes from the multiple second attributes may be corresponding to one game content. Therefore, it may be possible that one game content has a fire characteristic in the first attribute and has an attack characteristic in the second attribute, for example.

The information pertaining to the evolution may be the information including whether the evolution may be possible or not, the current evolution stage (the value of the evolution) and the conditions for a successful evolution (conditions of achieving the evolution) if the evolution may be possible, as well as the effects by the evolution (for example, an upgrade of the rarity) and similar evolutions. As an example in the embodiment, the evolution of a game content involves the consumption of the predetermined game content (an example of the game content of the predetermined type) corresponding to the game content. In this case, the information pertaining to the evolution may include the information showing the game content consumed for the evolution in every game content capable of evolving as the information pertaining to the conditions for achieving the evolution. In other words, each game content capable of evolving has a corresponding game content consumed for achieving the evolution (hereinafter, it may be called, "Game content for evolution materials"). The game content for evolution materials may be a game content allowing the grant of the evolution, however, it may not be necessary to be a game content used only for the evolution.

Figure 4A:
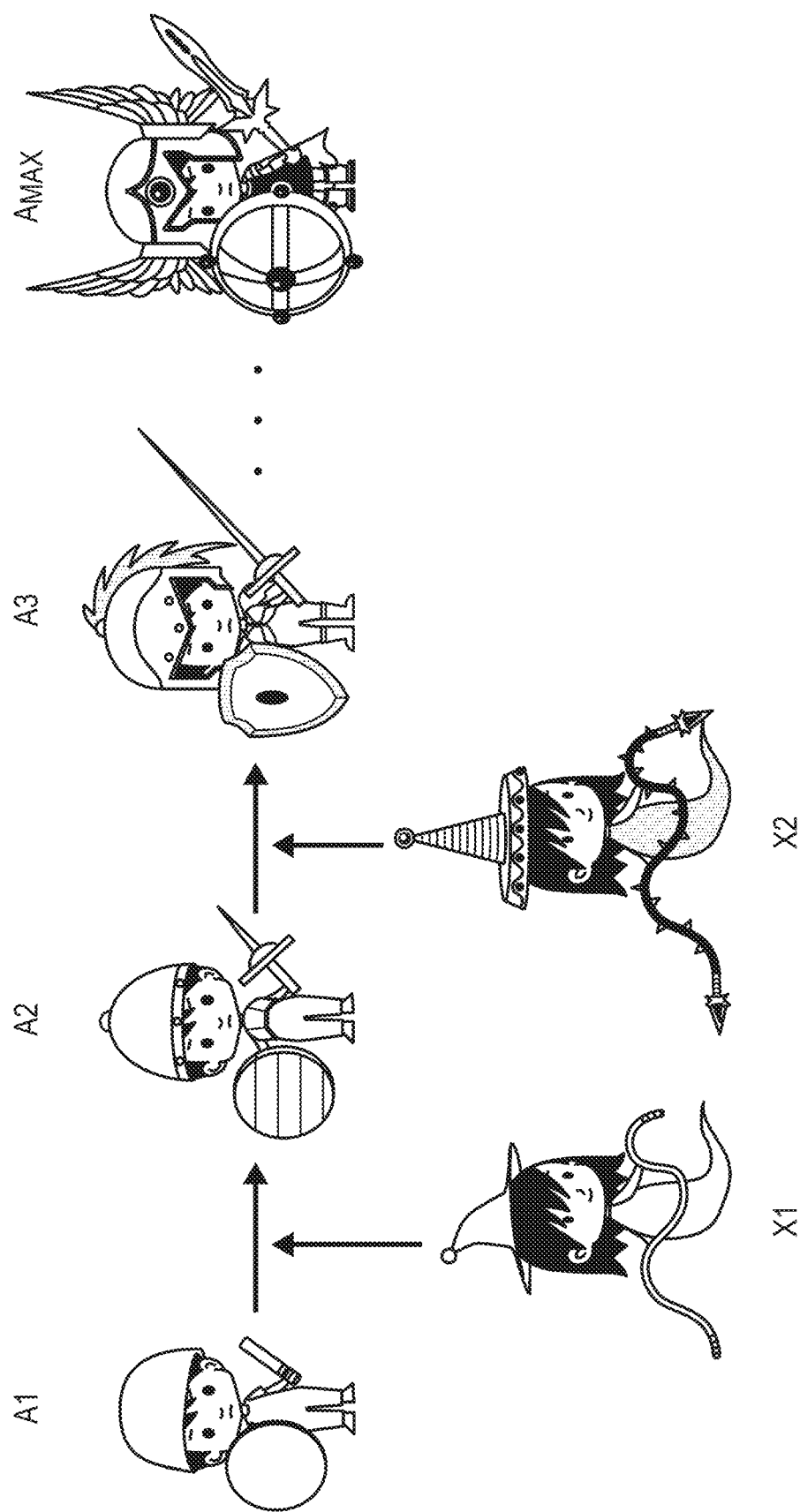
FIG. 4A is an explanatory diagram of evolution of the first game content.

For example, a game content (the game content "C01" herein) in FIG. 4A may be an example of the appearance of the evolution. In FIG. 4A, the changes of the game content "C01" which may be the game content capable of evolving according to the evolution may be shown. In this case, the game content "C01" allows the evolutions up to the upper limit, in which every evolution allows to advance from the character A1 to the character A2, from the character A2 to the character A3, and so on. In FIG. 4A, the maximum character AMAX reaching the upper limit of the evolution associated with a particular game content capable of evolving may be shown.

In addition, in FIG. 4A, a game content in which the game content name may be called character X (X1 and X2) may be shown as the game content for the evolution materials. The game content corresponding to the character X may be a game content capable of evolving or may be a game content lacking an evolution. Further, the game content for evolution materials corresponding to each game content capable of evolving may be different or the same. In FIG. 4A, in order to evolve the advanced game content "C01" (for example, the character A2), it may require consumption of the advanced game content for the evolution materials (X2, which may be more evolved game content for the evolution material than the game content for the evolution material X1), however, it may not be limited thereto. For example, the game content for an evolution material may be a game content that will never be evolved (the game content for the evolution material X1, herein).

Further, in FIG. 4A, the game content for the evolution materials may be different from the corresponding game content capable of evolving, or it may be the same. For example, the game content for the evolution materials corresponding to the game content "C01," which may be the game content capable of evolving, may include the game content "C01."

In addition, in FIG. 4A, the number of instances of game content used as evolution material for each instance for the game content capable of evolving may be one, however, it may not be limited thereto. In other words, the consumption of two or more such game contents for evolution materials may occur for each evolution of the game content capable of evolving.

The information pertaining to the strengthening may be the information including whether the strengthening may be possible or not, the conditions for the strengthening (conditions of achieving the strengthening) and the effects of the strengthening (for example, rules for changing status according to the strengthening quality) if strengthening is possible, as well as similar strengthening.

As an exemplary embodiment, the consumption of a predetermined game content (game content for strengthening materials) used for strengthening may be involved in the strengthening of a game content capable of being strengthened as a condition of achieving the strengthening. The game content for strengthening materials may be a game content allowing the grant of the strengthening, however, it may not be necessary to be a game content used only for the strengthening.

For example, a game content (the game content "C01" herein) in FIG. 4B may be an example of the appearance of the strengthening. In FIG. 4B, the changes to the game content "C01," which may be the game content capable of being strengthened undergoing a strengthening, may be shown. In this case, the ability parameter (a level, a HP, an attack power and a restoration power in FIG. 4B) of the game content "C01" may be appropriately increased in every strengthening. In the game content capable of being strengthened, when a level corresponding to the upper limit level is reached, the ability to advance in strengthening may be disabled. However, even in this case, the upper limit level may be allowed to be raised by using items for "Breaking the limit" or the equivalent (as an example of the game content).

In addition, in FIG. 4B, a game content in which the game content names may be called character Y1 and Y2 may be shown as the game content for the strengthening materials. The characters Y1 and Y2 may be given different game content IDs respectively or may be the same (in other words, it may be a game content capable of evolving and a character after the evolution).

In addition, in FIG. 4B, the number of instances of game content used for strengthening material that may be used each time in a strengthening process for the game content capable of being strengthened may be one, however, it may not be limited thereto. In other words, the consumption of two or more of the game contents for strengthening materials may be provided for each strengthening of the game content capable of being strengthened.

The information pertaining to game functions may include the information of game functions corresponding to the game content. The game functions may be specific functions (skills or abilities) corresponding to the game content. Further, an arbitrary number of the game functions may correspond to one game content. When a game function is performed, a predetermined game effect may occur, for example, in the competition game part. The substances of the game effects may be arbitrary defined. In the embodiment, a game effect advantageous to a user may exist. For example, a game effect giving a larger damage to an opponent than the regular attack may exist, or a game effect making an attack of an opponent weaker than normal may exist. The game effect occurred may continue during a predetermined period. In the embodiment, within the competition game content for a single player and the competition game content for multiple layers, one or more usable game functions may exist in one of the game contents or both of the game contents.

The substances of the information pertaining to the game functions may not be limited to the description above. For example, the information pertaining to the game functions may further include levels and values of experience for the game functions. The values of experience for the game functions may be increased depending on the consumption of the predetermined game contents owned by a user. The predetermined game contents may include arbitrary game contents set by the game functions. Further, the predetermined game contents may include one or more types of game contents defined in advance with respect to the game functions. The level of the game function may be increased when the value of the experiences for the game functions reaches the predetermined standard value. In other words, the game functions may allow for strengthening. The more advantageous game effects may occur for a user as the level of the game functions may be increased. For example, the amount of the damage given to an opponent may be increased when the level of the game functions is increased. Further, the game functions may be specific game functions with an awakening ability (such as a game function that the game effect may be more significant than a regular game function). In this case, in order to be awakened, the consumption of a predetermined item (an example of a game content) may be necessary. Awakening the specific ability in this situation may be an example of the strengthening of the game functions.

Each information corresponding to the game content ID may be arbitrary and may not be limited to the description above while referring to FIG. 3.

(Information Pertaining to Game Content of Opponent)

The server storage module 12 shown in FIG. 1 may store the information pertaining to the opponent game content (for example, an NPC) in the competition game part. The information pertaining to the opponent game content may include a game content ID of the game content, a game content name, a level, a HP, an attack power, a defense power, an attribute and a quickness. The explanations of a game content ID, a game content name, a level, a HP, an attack power and an attribute may be omitted as they may be the same as the forgoing information pertaining to the owned game content. The HP may be a parameter showing the degree of soundness of an opponent. When the HP of the opponent is reduced to the predetermined value (for example, zero), a victory of the user against the opponent may be determined. If the user wins against all of the opponents appeared in the competition game part, then the competition game part may be determined to be cleared. The defense power may be a parameter used to determine the amount of damages given to an opponent. For example, the amount of damages that can be giving to the opponent may be smaller as the defense power may be larger. The quickness may be a parameter used to determine the increased speed of action points of an opponent. For example, the larger the quickness, the faster the increased speed of the action points. When the action point reaches the upper limit value, the opponent may perform actions such as attacks.

The server control module 13 shown in FIG. 1 include one or more processors. The processor may include a general purpose processor accomplishing specific functions by reading specific programs and a special purpose processor dedicating to specific operations. The server control module 13 controls whole operations of the server device 10. Hereinafter, examples of the operations of the server control module 13 will be described in detail.

The server control module 13 may store multiple types of information and programs used for processing games into the server storage module 12. The information used for processing games may include the forgoing information pertaining to a user and the information pertaining to a game content of an opponent.

The server control module 13 executes the transmission and the reception of the information through the server communication module 11. For example, the server control module 13 may transmit at least one part of the information stored in the server storage module 12 to the terminal device 20. In this manner, the information stored in the server storage module 12 and the information stored in the terminal device 20 may be shared and synchronized. The timing for executing the information sharing and synchronizing may include, for example, the timing at which a new information may be stored in the server storage module 12 or the timing at which the information stored in the server storage module 12 may be updated, however, the timing may be defined as arbitrary.

The server control module 13 may execute games by coordinating with the terminal devices 20. For example, the server control module 13 may execute the competition game part by coordinating with one or more of the terminal devices.

Further, the server control module 13 may execute a game content lottery processing to increase the owned game contents of each user. For example, the server control module 13 may execute the game content lottery processing by receiving a request of the lottery (basically an event to draw a raffle) from the user. The conditions for the occurrence of the request of the lottery may be arbitrary. For example, the conditions for the occurrence of the request of the lottery may be satisfied by the consumption of the predetermined game contents. Alternatively, the conditions for the occurrence of the request of the lottery may be satisfied without the consumption of the predetermined game contents at the time of campaigns or initial registrations. The detail of the game content lottery processing will be described later.

(Configuration of Terminal Device)

The configuration of the terminal device 20 will be described in detail. As shown in FIG. 1, the terminal device 20 may include a terminal communication module 21, a terminal storage module 22, a display module 23, an input module 24 and a terminal control module 25.

The terminal communication module 21 may communicate with external devices by wireless or cable network and may include an interface to transmit and receive the information. The terminal communication module 21 may include a wireless communication module correlated with mobile communications standards such as LTE (Long Term Evolution) (a registered trademark), a wireless LAN communication module or a cable LAN communication module, for example. The terminal communication module 21 can transmit and receive the information with the server device 10 through the network 30.

The terminal storage module 22 may include, for example, the first storage device and the second storage device. The terminal storage module 22 may include a semiconductor memory, a magnetic memory, an optical memory or an equivalent memory. The terminal storage module 22 may store the information and the programs used for game processing received from the server device 10. The information and the programs used for the game processing may be obtained from the external devices through the terminal communication module 21. An application program of a game may be obtained from the predetermined application distribution server. Hereinafter, the application program may be simply called as the application. Further, a part or all of the information pertaining to a game content which may be an opponent of the competition and the information pertaining to a user described above may be obtained from the server device 10.

The display module 23 may include a display device such as a liquid crystal display or an organic EL (Electro-Luminescence) display, for example. The display module 23 can display varieties of screens.

The input module 24 may include an input interface that, for example, has a touch panel integrally provided with the display module 23. The input module 24 can accept a user input with respect to the terminal device 20. In addition, the input module 24 may include a physical key or may further include an arbitrary input interface functioning as a pointing device such as a mouse or an equivalent device.

The terminal control module 25 may include one or more processors. The terminal control device 25 controls the operations of the terminal devices 20 as a whole. Hereinafter, an example of the operations of the terminal control device 25 will be described in detail.

The terminal control module 25 may execute the transmissions and the receptions of the information through the terminal communication module 21. For example, the terminal control module 25 may receive the varieties of the information and the programs used for a game processing from at least one of the server device 10 and other external servers. The terminal control module 25 may store the received information and the programs into the terminal storage module 22.

The terminal control module 25 may activate a game application responding to an operation of a user. The terminal control module 25 may conduct a game by coordinating with the server device 10. For example, the terminal control module 25 may display various screens used for a game on the display module 23. On the screen, a GUI (Graphic User Interface) which detects the operation of the user may be displayed, for example. The terminal control module 25 can detect the operation of the user with respect to the screen through the input module 24.

As an example, the operation of the server device 10 and the terminal device 20 conducting the competition game part for a single player will be described in detail.

The terminal control module 25 may determine the upper limit value of the total HP of a user (for example, 1,000 points) used for the competition game part processing.

The terminal control module 25 may transmit an execution request of the competition game part to the server device 10 according to an operation of a user, for example. The server control module 13 may transmit the information used for the execution of the competition game part to the terminal device 20 when receiving the execution request from the terminal device 20. The server control module 13 and the terminal control module 25 may start the competition game part. The competition game part may be conducted by using one or more of the first game contents included in the deck, the second game content arranged in the virtual space and one or more of the game contents of the competition opponent.

The operation of the terminal control module 25 progressing the competition game part will be described. The terminal control module 25 may set the action points of the opponent to the initial value (for example, zero points) when the competition game part is started.

The first period and the second period may occur repeatedly and alternately during a playing the competition game part.

An example of the first period may be a period in which the action points of the opponent increased over time from the initial value (for example, zero points) to the upper limit value (for example, 1,000 points). Specifically, the terminal control module 25 may start an operation of increasing the action points of the opponent over time (increasing processing). The timing of the start of the increasing processing may correspond to the timing of the start of the first period. The terminal control module 25 may end the increasing processing when the action points of the opponent reach the upper limit value (for example, 100 points). The timing of the end of the increasing processing may correspond to the timing of the end of the first period.

The second period may be the period from the end of the first period to the timing of the reset of the action points of the opponent to the initial value. Specifically, after the second period starts, the terminal control module 25 may lead the opponent to conduct the predetermined actions (for example, attacks to a user). If not leading the first game content included in the deck to conduct the actions (for example, attacks against the opponent), the terminal control module 25 may lead the opponent to conduct the predetermined actions immediately after the second period may start. Contrarily, if leading the first game content in the deck to conduct the actions, the terminal control module 25 may lead the opponent to conduct the predetermined actions after waiting to end the actions by the first game content included in the deck. In such a case, the actions by the opponent may be executed after ending the actions by the first game content included in the deck. As described, the first period and the second period may occur repeatedly and alternately.

The terminal control module 25 may allow the first game content included in the deck to conduct the predetermined actions (for example, attacks against the opponent). Specifically, the terminal control module 25 may allow predetermined items appear in the virtual space in the first period. The terminal control module 25 may increase the action points of the first game content depending on the items obtained by the second game content. When the action points of the first game content are more than the predetermined standard value, the terminal control module 25 may lead the first game content to conduct the predetermined actions (for example, attacks against the opponent) and reduce the action points by only its standard value. The terminal control module 25 may lead the first game content to conduct the actions repeatedly until the action points of the first game content becomes less than the standard value. The actions by the first game content may end when the action points of the first game content are reduced to the value less than the standard.

An example of a play screen displayed on the terminal device 20 while playing the competition game part may be shown in FIG. 5. Specifically, a part of the scene of the two dimensional virtual space may be displayed on the play screen. Specifically, various objects arranged in the virtual space may be displayed on the play screen. The various objects include a movable object 40, road surfaces 41, items 42, as well as a leader 43, an opponent 44 and a growing item 46 (an example of a game content) in the first game content included in the deck, for example.

The movable object 40 may correspond to the second game content such as a motorcycle, a bicycle and a person. The terminal control module 25 may move the movable object 40 automatically in the virtual space toward the predetermined directions in the virtual space (for example, the right direction on the screen). In the embodiment, the terminal control module 25 may move the road surfaces 41 and the items 42 toward the left direction of the screen by scrolling without changing the position of the movable object 40 with respect to the left-and-right directions of the screen. In such a way, the movable object 40 moving automatically in the virtual space may be expressed. The terminal control module 25 may allow objects such as the road surfaces 41 and the items 42 appear sequentially with scrolling of the screen in the traveling direction of the movable object 40 in the virtual space. The terminal control module 25 may change the algorithm of processing of objects appearance between the first period and the second period.

The movable object 40 can travel on the road surfaces 41. The terminal control module 25 may allow the road surface 41 to appear in the virtual space. The terminal control module 25 may disconnect the road surfaces 41 in the first period as shown in FIG. 5. On the other hand, the terminal control module 25 may reduce the number of the appearance or the frequency of the appearance of the disconnections of the road surfaces 41 in the second period. For example, the terminal control module 25 may make the number of the appearance or the frequency of the appearance of the disconnections of the road surfaces 41 in the second period zero. In such as case, the road surface 41 may be controlled so that it may not be disconnected.

The terminal control module 25 may allow the items 42 to appear in the virtual space in the first period. On the other hand, the terminal control module 25 may reduce the number of the appearance or the frequency of the appearance of the items 42 in the second period. For example, the terminal control module 25 may make the number of the appearance or the frequency of the appearance of the items 42 in the second period zero. In such a case, the items 42 may be controlled so that they do not appear. The terminal control module 25 may determine that the item 42 may be obtained when the movable object 40 and the item 42 are overlapped on the screen. In the embodiment, the items 42 may include attribute items and restoration items.

The attribute item may correspond to at least one of the first attributes of the game contents. For example, when an item corresponding to a fire characteristic may be obtained, the terminal control module 25 may increase each of the action points of the first game content of the fire characteristic respectively out of the first game contents included in the deck. The terminal control module 25 may lead the first game content to automatically conduct the predetermined actions (for example, attacks against the opponent) when the action point of the first game content reaches more than the predetermined standard value. For example, when leading the first game content to conduct the attacks against the opponent, the terminal control module 25 may reduce the HP of the game content of the opponent. Further, the terminal control module 25 may reduce the action points of the first game content conducting the attacks by the amount of the standard value. For example, if the action points of the first game content may be 350 points and the standard value may be 100 points, the terminal control module 25 may make the first game content attack three times total. Then the terminal control module 25 may reduce the action points of the first game content by only the standard value (100 points)×three times=300 points. Therefore, after conducting attacks three time, the action points of the first game content becomes 50 points, 350 points−300 points=50 points.

Contrarily, when the restoration item may be obtained, the terminal control module 25 may increase the total HP of the user according to the total restoration power of the user.

The terminal control module 25 can make the movable object 40 jump toward the upper direction of the screen depending on the operation of the user with respect to the terminal device 20. For example, the user can avoid letting the movable object 40 fall at the discontinuous part of the road surfaces 41 by making the movable object 40 jump at the discontinuous part of the road surfaces 41. If the movable object 40 falls down from the road surface 41, the terminal control module 25 may reduce the total HP of the user and then recover the movable object 40 back to the road surface 41. Further, the user can let the movable object jump according to the positions of the items 42 and can get the items 42.

The terminal control module 25 may make the display of the opponent 44 disappear when winning against the opponent 44 and may execute a performance display showing that the user gained the growing item 46 that the opponent 44 owned. In this case, the terminal control module 25 may update the information pertaining to the owned game contents related to the user (referring to FIGS. 2 and 3) as the growing item 46 may be newly added.

The field 45 on the screen in FIG. 5 may be the field displaying the gauge for the balance of the total HP, the field 48 on the screen may be the field displaying the gauge for the balance of the opponent's HP, and the area 49 on the screen may be the area showing the status of each first game content included in the deck. The status of the first game contents may include the status of execution proprieties (such as activation of an attack or a skill against the opponent) of the next action which may change depending on the obtained items 42 and the detailed explanation will be omitted herein.

(Game Content Lottery Processing)

Next, the game content lottery processing may be described.

Figure 6:
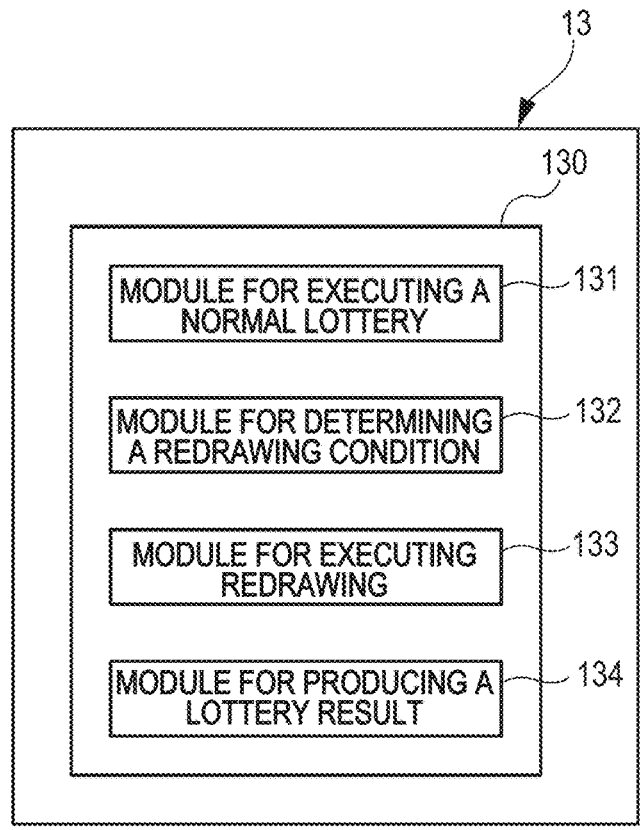
FIG. 6 is a diagram showing a configuration of functions related to a game content lottery processing in a server control module.

A diagram in FIG. 6 may show the configuration of functions related to a game content lottery processing part within the functions of the server control module 13.

The server control module 13 may execute the game content lottery processing. The game content lottery processing may be an operation that may receive the request of the lottery from each user as described above and may execute the operation, and further, it may be an operation to increase the owned game contents of each user.

In general, the more owned game contents, the richer varieties in the deck, and therefore, the more advantages to a user. In addition, when the first game content with a relatively high ability parameter is used, the possibility of the user winning in the competition game part may tend to be higher compared to when the first game content with relatively low ability parameter may be used. Therefore, a user normally may tend to desire to have a game content with a high ability parameter or a game content that may make the ability parameter higher by strengthening or the equivalents as an owned game content. The game content lottery processing may be an operation to respond to such a desire of the user.

As shown in FIG. 6, the server control module 13 may include a module for processing a lottery 130. The module for processing the lottery 130 may include a module for executing a normal lottery 131, a module for determining a redrawing condition 132, a module for executing redrawing 133 and a module for producing a lottery result 134.

The module for executing a normal lottery 131 may execute normal lottery processing. The normal lottery processing represents the lottery processing other than a redrawing processing described later. For example, the module for executing a normal lottery 131 performs one instance of normal lottery processing by extracting one game content arbitrarily (randomly) from a lottery target group which may include each one of all game contents. When the lottery processing is a multiple continuous execution (in other words, multiple instances of lottery processing may be executed as one set such as drawing a raffle ten times in a row), the lottery target group may be all the same every time or an embodiment may be reset so as the game contents already drawn may be excluded. Alternatively, the module for executing a normal lottery 131 may decide the predetermined combinations of the game contents selected by arbitrary or predetermined rules (the total number may be smaller than the total number of all of the game contents) as the lottery target group. For example, the module for executing a normal lottery 131 may set the lottery target group containing the predetermined number of the first game contents with two or more of the rarity SSR game contents from all of the first game content. In this case, the game contents with the rarity SSR may be the special game contents for the limited time only depending on, for example, a hosting period.

When setting the lottery target group with an embodiment containing each one of all the game contents (the initial lottery target group for a case of the lottery processing executing multiple lotteries continuously), two or more game contents with the rarity SSR may be always included in the set lottery target group. On the other hand, when setting the lottery target group with an embodiment other than the embodiment above (the initial lottery target group for a case of the lottery processing executing multiple lotteries continuously), it may be preferred to include at least two or more of the game contents with the rarity more than the predetermined standard (for example, SR or SSR) in the set lottery target group.

Alternatively, a specification may be such that a providing probability may be set every type of a game content. In this case, the module for executing a normal lottery 131 may select a game content based on the set providing probability. In such a case, as described above, if N (normal), R (rare), SR (super rare) and SSR (double super rare) correspond to the providing probability of game content types, PN, PR, PSR and PSSR respectively, the probability may be PN>PR>PSR>PSSR.

As an alternative, the game content may be selected (lottery) depending on the providing order determined in advance. For example, as described above, if the rarity of each N, R, SR and SSR correspond to the number of game content types, NN, NR, NSR and NSSR respectively, the module for executing a normal lottery 131 may form a queue with game contents of the total number Ntotal (=NN+NR+NSR+NSSR) and draw a game content one by one with the order of an alignment sequence. In such a case, the total number may be a finite number, however, the total number may be unlimited or less than Ntotal in further modifications. In addition, the alignment sequence may be determined depending on the providing probability or may be determined depending on other parameters. One of each type of the game contents may be included in the queue, however, with an embodiment such that specific types of game contents may be included more than other types of game contents, numbers of the game contents of each game content type included may be set differently. The same modifications of such normal lottery processing apply to redrawing processing which may be described later. Further, the normal lottery processing approach of the normal lottery processing and the redrawing processing approach may be basically the same, however, a completely different embodiment may be achieved, for example, one uses the providing probability and the other uses the queue.

The module for determining a redrawing condition 132 may determine whether or not the redrawing condition may be satisfied based on the result of the normal lottery processing and the information pertaining to the user in the server storage module 12. The redrawing condition may be satisfied when a game content selected by the normal lottery processing for drawing a game content responding to a user of the game system may be possibly a low value or not so high value for the user, even though the absolute value of the game content may be relatively high.

The absolute value herein may be the value that does not fluctuate in games and a game content with a relatively high absolute value may be the game content with a relatively high rarity or the game content with a relatively high ability parameter, for example. In other words, rarity and an ability parameter showing the relative values between game contents and representing as the index values may be also the index values showing the absolute values. The game content with a relatively high absolute value may tend to be essentially a high value game content for any user.

However, the values may be different within multiple types of game contents with relatively high absolute values depending on a user. Such a variance may occur depending on the relationship between a user and the owned game content, preferences of the user, or other factors. For example, if there may be more than two types of game contents with the best absolute value (an example may be a game content with rarity SSR) and if a user already owns one of them, the other game content rather than the owned game content may tend to be more valuable for the user.

In the embodiment, the redrawing conditions may be set to be resolved such a variance between the absolute value and the value of the user.

Specifically, as an example of the embodiment, the redrawing conditions according to the lottery processing of the game system related to the user of the game system may be satisfied when the following conditions (1) and (2) may be fulfilled at the same time.

The condition (1): The rarity of the game content drawn in the lottery processing of the game system may be more than the predetermined rarity. The predetermined rarity may be arbitrary, however, it may be preferable that the rarity may be relatively high from the view point of reducing the load of a redrawing processing and as an example of the embodiment, the predetermined rarity may be defined as SSR.

The condition (2): The game content drawn in the lottery processing of the game system may be the same as the owned game content of the user of the game system.

As an example of the embodiment, regarding the condition (2) (or a similar condition described later such as a condition (2a) described later), the sameness of the game contents may be determined based on the sameness of the game content IDs. In other words, game contents having the same ID may be the same game contents as each other. For example, as shown in FIG. 3, although the data itself of the character A1 and the character A2 may be different as game contents, they may be treated as the same game content. Specifically, in the embodiment, the game contents on which the changes (such as the evolution or the strengthening) may be possible may be considered to be the same game contents regardless of whether or not the changes have occurred or the degree of the changes. Depending on a specification, different game content IDs may be given to characters with different degrees of evolutions, such as the character A1 and the character A2, respectively. In this case, specific information showing the relativeness may be given to characters in which the only difference may be a degree of evolution. For example, the specific information may be achieved by enabling the game content IDs of characters with different degrees of evolution to have the common part or letting the characters with different degrees of evolution have the relevant information showing that the only difference may be the degree of evolution. The relevant information may be a relativeness parameter, for example, and in this case, game contents may be determined to be different if the relativeness parameter may be "0" and the only difference in characters may be determined to be the degree of evolution if the relativeness parameter may be "1." Even in such a specification, the game contents in which the changes (such as the evolution or the strengthening) may be possible may be still treated as the same game contents in spite of whether or not there may be may change or the degree of may change, and the sameness of the game contents may be determined based on the specific information in such a specification.

In this case, when a game content that is relatively difficult to obtain (in other words, the rarity of the game content may be SSR) is drawn and the game content is already owned by the user, the redrawing conditions may be satisfied. A game content that a user does not own may be more valuable for the user than the other game content that the user already owns out of the multiple types of game contents with SSR rarity. Therefore, in such redrawing conditions, it may be possible for the user to obtain more valuable game contents (for example, other game contents with SSR rarity) easily by redrawing according to the establishment of the redrawing conditions.

The condition (1) may be changed to the condition (1A) or the condition (1B) based on the following.

The condition (1A): The rarity of the game content drawn in the lottery processing of the game system may be SR or SSR.

The condition (1B): The ability of the game content drawn in the lottery processing of the game system may be a higher ability than the predetermined standard.

The condition (2): The game content drawn in the lottery processing of the game system may be the same as the owned game content of the user of the game system.

Further, the condition (1A) may correspond when the predetermined rarity according to the foregoing condition (1) may be SR. Regarding the condition (1), the ability of the game content may be determined based on the ability parameter described above. For example, when the HP is more than the predetermined threshold value HPth, the condition (1B) may be satisfied.

In general, there may be correlations between the rarity and the ability. In other words, the HP, the attack power and other abilities may tend to be set higher for the game contents with rarity SSR than the game contents with rarity R (rare). Therefore, the condition (1B) can also function the same way as the condition (1) or the condition (1A) as described above. However, depending on a game content or a specification of the game system, there may be a possibility that there may be no correlation between the rarity and the ability. Even in such a case, the condition (1B) may be used instead of the condition (1) or the condition (1A) described above, or the condition (1) or the condition (1A) described above may be used.

Further, the condition (2) may be changed to the condition (2a) as following:

The condition (2a): The game content drawn in the lottery processing of the game system may be the same as the owned game content of the user of the game system in the past.

The owned game content in the past may be a game content that the user used to own in the past but not currently owned due to the sale or other activities.

In this case, when a game content that may be relatively difficult to obtain (in other words, the rarity of the game content may be SSR) may be drawn and the game content was owned by the user in the past, the redrawing conditions may be satisfied. A game content that a user has never owned before may be more valuable for the user than the game content that the user used to own in the past out of the multiple types of game contents with SSR rarity. Therefore, in such redrawing conditions, it may be possible for the user to obtain more valuable game contents (for example, other game contents with SSR rarity) easily by redrawing according to the establishment of the redrawing conditions.

In other embodiments, the redrawing conditions according to the lottery processing of the game system related to the user of the game system may be satisfied when the following conditions (1) and (2A) are fulfilled at the same time.

The condition (1): The rarity of the game content drawn in the lottery processing of the game system may be more than the predetermined rarity (in the embodiment, the predetermined rarity may be SSR as described above).

The condition (2A): The game content drawn in the lottery processing of the game system may be already owned by the user of the game system in a quantity more than the predetermined number Nth. (In other words, the game content drawn in the lottery processing corresponding to the user of the game system may be the same as the owned game content that the user owns more than the predetermined number Nth out of the owned game contents corresponding to the user of the game system.)

The predetermined number Nth may be an arbitrary number that may be two or more.

In this case, when a game content that may be relatively difficult to obtain (in other words, the rarity of the game content may be SSR) may be drawn and the game content is already owned by the user in a quantity more than the predetermined number Nth, the redrawing conditions may be satisfied. A game content that a user does not own may be more valuable for the user than the other game content that the user already owns more than the predetermined number Nth out of the multiple types of game contents with SSR rarity. Therefore, in such redrawing conditions, it may be possible for the user to obtain more valuable game contents (for example, other game contents with SSR rarity) easily by redrawing according to the establishment of the redrawing conditions.

In yet other embodiments, the redrawing conditions according to the lottery processing of the game system related to the user of the game system may be satisfied when the following conditions (1C) and (2B) are fulfilled at the same time.

The condition (1C): The rarity of the game content drawn in the lottery processing of the game system may be SR (the rarity may be before the evolution).

The condition (2B): The game content drawn in the lottery processing of the game system may be a game content capable of evolving and may be the same as the owned game content of the user of the game system and further, the owned game content has reached the upper limit of the evolution (in other words, the rarity has reached SSR).

When a game content allowing evolution has reached the upper limit of its evolution, specifically, when the rarity has reached SSR, there may be a lower demand for a game content that is the same as the game content capable of evolving (a game content before the evolution, and therefore, the rarity may be lower than SSR). Therefore, in such redrawing conditions, it may be possible for the user to obtain more valuable game contents (for example, other game contents with SR rarity) easily by redrawing according to the establishment of the redrawing conditions.

In yet other embodiments, the redrawing conditions according to the lottery processing of the game system related to the user of the game system may be satisfied when the following conditions (1C) and (2C) may be fulfilled at the same time.

The condition (1C): The rarity of the game content drawn in the lottery processing of the game system may be SR.

The condition (2C): The game content drawn in the lottery processing of the game system may be a game content for evolution materials corresponding only to the owned game content that has reached the upper limit of the evolution (in other words, the rarity has reached SSR) out of the owned game contents of the user of the game system.

When a game content (formerly) capable of evolving has reached the upper limit of its evolution, the game content (formerly) capable of evolving can't further evolve, and therefore, there may be a lower demand for a game content for evolution materials corresponding only to this game content. For this reason, another game content other than such game contents for evolution materials may be more valuable for the user (for example, other game contents for evolution materials with SR rarity). Accordingly, in such redrawing conditions, it may be possible for the user to obtain more valuable game contents (for example, other game contents with SR rarity) easily by redrawing according to the establishment of the redrawing conditions.

In yet other embodiments, the redrawing conditions according to the lottery processing of the game system related to the user of the game system may be satisfied when the following conditions (1) and (2D) may be fulfilled at the same time.

The condition (1): The rarity of the game content drawn in the lottery processing of the game system may be more than the predetermined rarity (in the embodiment, the predetermined rarity may be SSR as described above).

The condition (2D): The game content drawn in the lottery processing of the game system may be a game content capable of being strengthened and may be the same as the owned game content of the user of the game system and further, the owned game content has reached the upper limit of the strengthening.

A state reaching the upper limit of the strengthening may correspond to the state in which the level has reached the upper limit level. As an example in the embodiment, the upper limit level may be allowed to be raised by strengthening of a strengthening embodiment called "Breaking the limit," and the consumption of the same game content as a game content capable of being strengthened for strengthening may be determined to be involved in the strengthening of the strengthening embodiment called "Breaking the limit." In this case, the state reaching the upper limit of the strengthening may correspond to the state in which the level has reached the upper limit after the limit has raised.

When a game content capable of being strengthened has reached the upper limit of possible strengthening, then further strengthening of the game content (formerly) capable of being strengthened may not be possible, and therefore, there may be a low demand for a game content to be the same as this game content (usefulness as a game content for strengthening materials). For this reason, another game content other than such game contents may be more valuable for the user (for example, other game contents with SSR rarity). Accordingly, in such redrawing conditions, it may be possible for the user to obtain more valuable game contents (for example, other game contents with SSR rarity) easily by redrawing according to the establishment of the redrawing conditions.

The module for executing redrawing 133 may conduct the redrawing execution when the redrawing conditions are determined to be satisfied by the module for determining a redrawing condition 132. In addition, the module for executing redrawing 133 may be set to always conduct the redrawing execution when the redrawing conditions are determined to be satisfied by the module for determining a redrawing condition 132. Alternatively, the module for executing redrawing 133 may be set to conduct the redrawing execution upon confirming that a user has requested the redrawing when the redrawing conditions are determined to be satisfied by the module for determining a redrawing condition 132. In this case, since leaving the final decision on a user to determine whether or not the redrawing should be conducted, disadvantages that may occur during the automatic redrawing execution can be prevented (for example, the redrawing that the user may not desire may be executed).

The redrawing processing may be performed by using the lottery target group in which only a part of game contents was extracted (hereinafter, in order to differentiate, the group may be called "Redrawing target group") from the recent lottery target group (an example of multiple types of game contents of the first group) used in the module for executing a normal lottery 131. In other words, the module for executing redrawing 133 may accomplish one normal lottery processing by extracting one game content arbitrarily (randomly) from the redrawing target group (an example of multiple types of game contents of the second group).

A method of setting up the redrawing target group may be arbitrary, however, the redrawing target group may be basically set up in such a way that the probability of drawing the game content drawn in the recent normal lottery processing (in other words, the rarity may be SSR but the same game content as the owned game content of the user) again may be lower than the probability of drawing other game contents with the rarity SSR. In addition, the redrawing target group may be set up in a way that the probability of drawing a game content with the rarity SSR may be extremely high. For example, the redrawing target group may be configured only of the game contents with the rarity SSR.

In the embodiment, the predetermined rarity according to the foregoing condition (1) may be SSR, however, when the predetermined rarity according to the condition (1) is another rarity, the method of setting up the redrawing target group may be changed depending on a situation. For example, when the predetermined rarity according to the condition (1) may be SR, the redrawing target group may be set up in such a way that the probability of drawing the game content drawn in the recent normal lottery processing (in other words, the rarity may be more than SR but the same game content as the owned game content of the user) again may be lower than the probability of drawing other game contents with the rarity more than SR. In addition, the redrawing target group may be set up in a way that the probability of drawing a game content with the rarity more than SR may be extremely high. For example, the redrawing target group may be configured only of the game contents with the rarity more than SR. in this case, the redrawing target group may be set as: drawing a game content with the same rarity as the game content drawn in the recent normal lottery processing always occurs, or the probability of drawing a game content with the same rarity is extremely high.

Figure 7A:
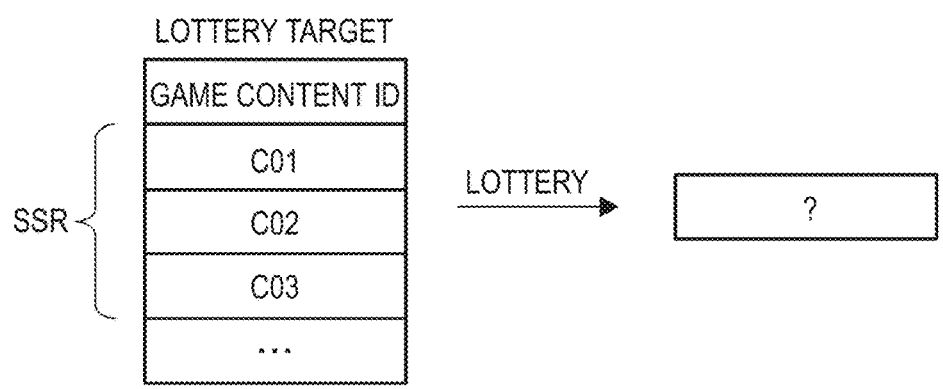
FIG. 7A is a diagram showing an aspect of a general lottery processing conceptually.
Figure 7B:
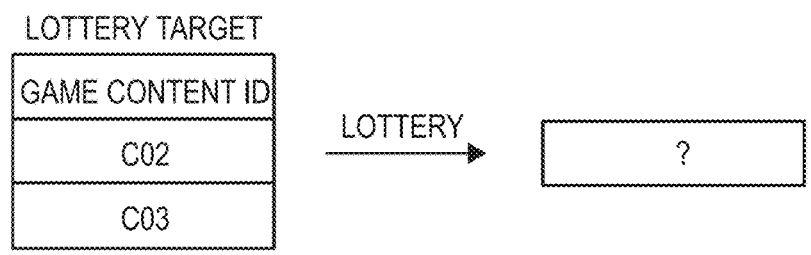
FIG. 7B is a diagram showing an aspect of a redrawing processing conceptually.

FIGS. 7A and 7B may be explanatory diagrams showing examples of the relationship between the normal lottery processing and the redrawing processing and FIGS. 7A and 7B show the conceptually aspects of the normal lottery processing and the redrawing processing respectively. In FIG. 7A, an aspect of a game content of the game system being drawn from game contents corresponding to multiple game content IDs may be shown schematically. In FIG. 7A, as an example, three rarities of the game contents, "C01" to "C03," may be SSR and the game content "C01" may be presumed to be drawn by the normal lottery processing. In this case, as shown in FIG. 7B, the redrawing target group may be configured by removing game contents with the rarity less than SSR from the recent lottery target group (referred to FIG. 7A) used in the module for executing a normal lottery 131 and further removing the game content "C01." In other words, the redrawing target group may be configured by removing the game content "C01" from the game contents "C01" to "C03." Therefore, the redrawing target group has two game contents, "C01" and "C02," and one of the game contents, "C01" or "C02," may be drawn with a 50% chance.

The module for producing a lottery result 134 may execute processing to newly correlate a game content drawn in the normal lottery processing or the redrawing processing to a user, specifically, a processing to enable the user to own the game content. In particular, the module for producing a lottery result 134 may add the game contents of the game system based on the information pertaining to the owned game contents associated to the user of the game system (referred to FIGS. 2 and 3) when enabling the user of the game system to own the game content of the game system.

Specifically, the module for producing a lottery result 134 may execute processing to newly correlate a game content drawn in the redrawing processing to a user when the redrawing processing was performed subsequent to the normal lottery processing. As an example of a modification, the redrawing processing may be a specification that may execute the redrawing processing multiple times (in other words, further redrawing processing with respect to the redrawing processing). In this case, the module for producing a lottery result 134 may execute processing to newly correlate a game content drawn in the final redrawing processing to a user. On the other hand, the module for producing a lottery result 134 may execute processing to newly correlate a game content drawn in the normal lottery processing to a user when the redrawing processing may not be performed.

According to an exemplary embodiment, particularly, excellent effects such as the following may be achieved.

According to an exemplary embodiment, when the predetermined redrawing conditions are satisfied as described above, the redrawing processing may be performed. By redrawing, it may be possible for a user to obtain more valuable game contents easily.

In the embodiment, as described above, since the redrawing conditions specifically include the foregoing condition (1) (also the condition (1A) and similar conditions), the frequency of the execution of the redrawing processing can be appropriately controlled compared to a specification that the redrawing conditions can be established with respect to any game content with any rarity, for example. As a result, it may be possible to allow a user an opportunity to redraw appropriately while controlling the load of a server computer.

In addition, according to an exemplary embodiment, as described above, since the redrawing conditions include the foregoing condition (2) (also the condition (2A) and similar conditions), the redrawing conditions that consider the relationship between the game content drawn in the lottery processing and the owned game content of the user can be set.

Whether or not the game content drawn in the lottery processing may be a high value game content for a user can be precisely determined by considering the relationship between the game content drawn in the lottery processing and the owned game content of the user. For example, a specification that the redrawing conditions may be established only when the same type of the game content was drawn during the multiple lottery processing such as drawing a raffle ten times in a row (hereinafter, refer to "A comparative example") may not consider the relationship between the game content drawn in the lottery processing and the owned game content of the user. Therefore, in such a comparative example, the redrawing condition may be too limited and a chance of satisfying the redrawing condition may become very limited. As a result, in such a comparative example, even when the game content drawn in the lottery processing may be a game content which may not be much valuable for the user in spite of the rarity SSR, for example, there may be a high possibility that the redrawing condition may not be satisfied.

In view of this aspect, according to an exemplary embodiment, as described above, the owned game contents of the user (in other words, the information pertaining to the owned game contents associated with the user (refer to FIGS. 2 and 3)) may be considered, the disadvantages that may occur in such a comparative example described above can be minimized. For example, when the game content drawn in the lottery processing may be a game content which may not be very valuable for the user in spite of the rarity SSR, there may be a high possibility that the redrawing condition is satisfied. As a result, when a certain type of a game content that may be relatively difficult to obtain (in other words, a game content with the rarity SSR) may be drawn, it may be possible for a user to obtain more valuable game content easily.

Further, in the foregoing examples, the condition (2) or the condition (2A) have been shown pertaining to the redrawing conditions that the relationship between the game content drawn in the lottery processing and the owned game contents of the user was considered, however, these conditions may be used in combination appropriately, or other similar conditions or different conditions may be added without causing inconsistency in an embodiment. For example, regarding the redrawing condition that may be satisfied when the foregoing conditions (1C) and (2B) may be satisfied at the same time, the following condition (2E) may be used by incorporating the element of the condition (2A) into the condition (2B).

The condition (2E): The game content drawn in the lottery processing of the game system may be a game content capable of evolving, the same as the owned game contents that the user of the game system owns more than the predetermined number Nth, and further, at least one of the owned game contents that the user owns more than the predetermined number Nth has reached to the upper limit of the evolution.

Next, a summary of the communication between the server device 10 and the terminal device 20 when the redrawing processing is executed will be described while referring to FIG. 8.

Figure 8:
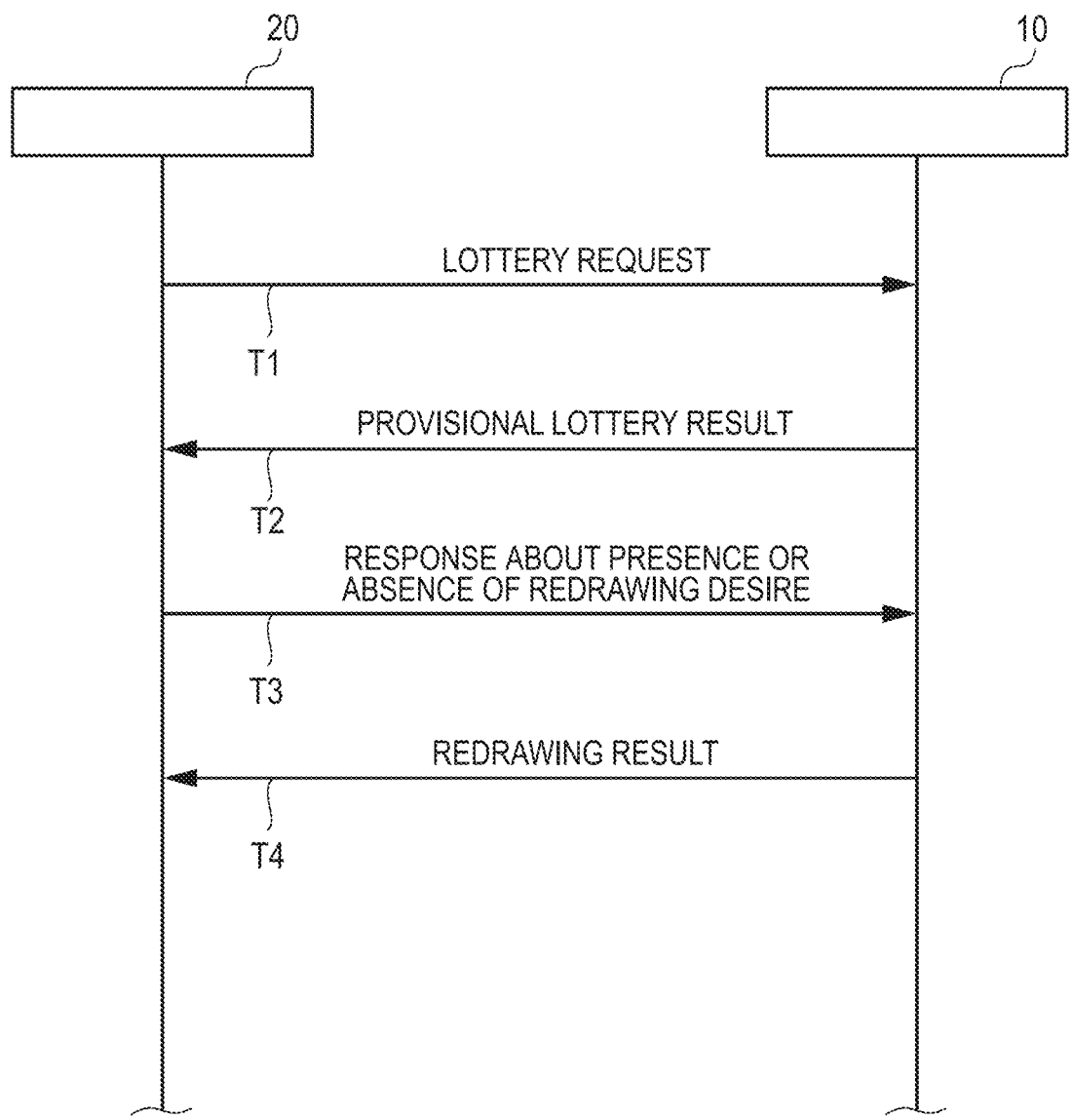
FIG. 8 is an explanatory diagram of communications between a server device and a terminal device when a redrawing processing is executed.

As shown in FIG. 8, first, the terminal device 20 may transmit the request of the lottery to the server device 10 (refer to T1) as a response to the operation of the user (for example, an operation of a raffle button). The lottery request may include the information showing a type of a raffle (for example, the information that can specify which type of raffle may be selected when multiple types of raffles may be allowed to be selected).

The server device 10 may execute the normal lottery processing when receiving a request of the lottery. In the embodiment herein, the redrawing conditions may be satisfied according to the result of performing the normal lottery processing. In this case, the server device 10 may transmit the information showing a game content drawn in the normal lottery processing to the terminal device 20 as a result of a provisional lottery (refer to T2). The result of the provisional lottery may be an aspect that can be changed depending on a performance in the following redrawing and it may be different from a result of the lottery when the redrawing conditions may not be satisfied.

Figure 9:
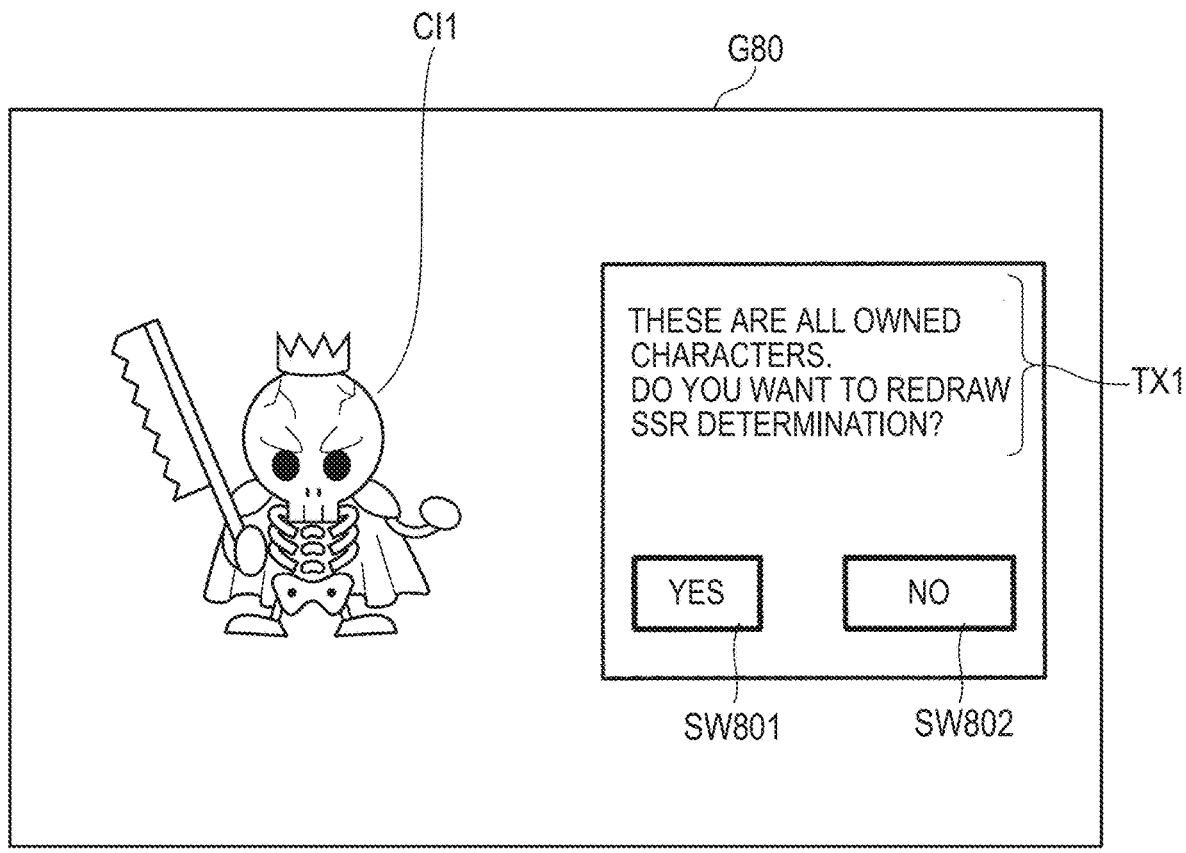
FIG. 9 is a diagram showing an example of an inquiring screen for providing an inquiry regarding whether a user wishes to redraw or not.

The terminal device 20 creates a screen inquiring to a user whether or not the user wishes to redraw and output on the display module 23 when receiving the result of the provisional lottery (refer to FIG. 9). Therefore, the result of the provisional lottery functions as an inquiry to the user whether or not the user wishes to redraw. In FIG. 9, a schematic example of the screen inquiring to the user whether or not the user wishes to redraw may be shown. In the screen G80 shown in FIG. 9, a character screen CI1 corresponding to a game content drawn this time as well as an inquiring message TX1 may be displayed. Further, in the screen G80 shown in FIG. 9, switches (touch switches), SW801 and SW802, may be set up to input whether or not the user wishes to redraw. In this case, the user looks at the screen CI1, and the user may operate the switch SW801 when wishing to redraw and may operate the switch SW802 when not wishing to redraw. When one of the switches, SW801 or SW802, may be operated, the terminal device 20 may transmit the information showing whether one of the switches may be operated (in other words, a response to whether or not the user wishes to redraw) to the server (refer to T3). In the example herein, the switch SW801 may be assumed to be operated.

The server device 10 may determine a necessity of the redrawing processing depending on the response when receiving the response corresponding to whether or not the user wishes to redraw. In the example herein, the switch SW801 may be operated and the redrawing may be determined to be necessary. Therefore, the server device 10 may execute the redrawing processing and may transmit the information showing a game content drawn in the redrawing processing to the terminal device 20 as a result of the lottery (refer to T4). In this case, the server device 10 may update the information pertaining to the owned game contents associated with the user based on the result of the lottery (refer to FIGS. 2 and 3).

Next, examples of executions of the module for processing a lottery 130 in the server control module 13 will be described while referring to FIGS. 10 to 12.

Figure 10:
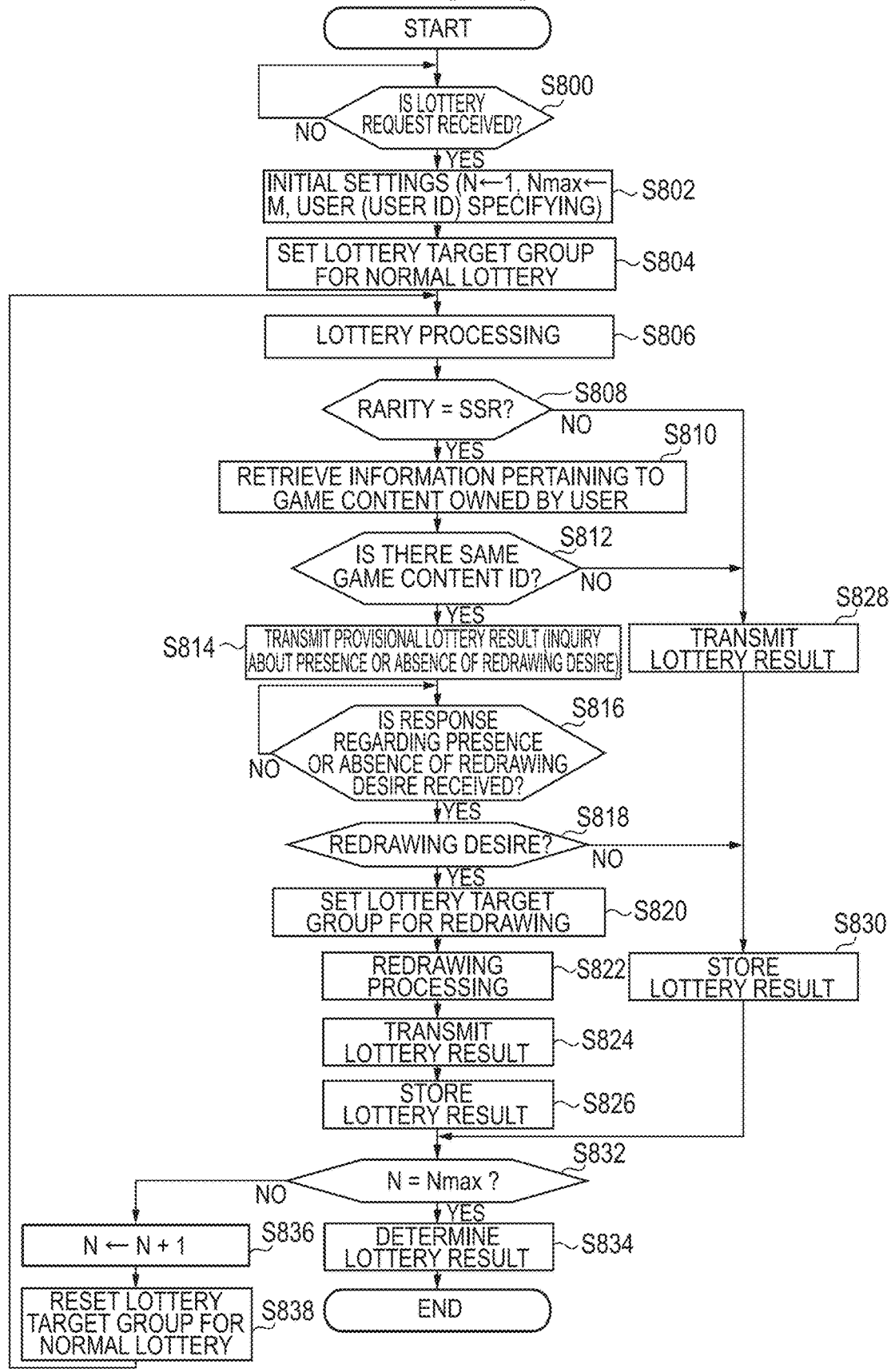
FIG. 10 is a schematic flowchart showing an example of processing executed by a module for processing a lottery.

FIG. 10 may be a schematic flowchart showing an example of processing executed by the module for processing the lottery 130 in the server control module 13.

In a step S800, the module for processing the lottery 130 may determine whether or not a request of the lottery has been received from the terminal device 20. The process may proceed to a step S802 if the request of the lottery was received from the terminal device 20 and, in other cases, the process may be in the state of waiting to receive the request of the lottery from the terminal device 20.

In the step S802, the module for processing the lottery 130 may execute the initial setting for the lottery processing. Specifically, the module for processing lottery 130 may set up N to be the initial value 1 and then may set up NMAX to be the raffle number M. The raffle number M may be an information included in the request of the lottery. For example, in case of a raffle conducted ten times in a row, M equals ten. In addition, the module for processing the lottery 130 may specify the user (the user ID) who transmitted the request of the lottery. The user who transmitted the request of the lottery can be specified based on the information such as the information included in the request of the lottery. Further, the module for processing the lottery 130 may reset (clear) a lottery result recording area (not shown in figures) configured by, for example, RAM (Random Access Memory) or an equivalent memory.

In a step S804, the module for executing a normal lottery 131 of the module for processing the lottery 130 may set up the lottery target group for the normal lottery. As an example herein, the module for executing a normal lottery 131 may set up the lottery target group including each one of all game contents. Further, the lottery target group may be set depending on a raffle type that the user selected.

In a step S806, the module for executing a normal lottery 131 of the module for processing the lottery 130 may execute the normal lottery processing. Specifically, the module for executing a normal lottery 131 may draw a game content of the game system from the current lottery target group.

In a step S808, the module for determining a redrawing condition 132 of the module for processing the lottery 130 may determine whether or not the game content drawn in the step S806 may be correlated with the higher rarity than the predetermined standard. As an example herein, as the foregoing condition (1), the module for determining a redrawing condition 132 may determine whether or not the rarity of the game content drawn in the step S806 may be SSR. The process may proceed to a step S810 if the result of the determination is "YES" and, in other cases, the process may proceed to a step S828.

In the step S810, the module for determining a redrawing condition 132 of the module for processing the lottery 130 may obtain (read) the information pertaining to the owned game content associated to the user (refer to FIGS. 2 and 3) specified in the step S802 from the server storage module 12.

In a step S812, the module for determining a redrawing condition 132 of the module for processing the lottery 130 may determine whether or not the game content drawn in the step S806 is already owned by the user specified in the step S802 based on the information pertaining to the owned game content obtained in the step S810. The process may proceed to a step S814 if the result of the determination is "YES" and, in other cases, the process may proceed to the step S828.

In the step S814, the module for processing the lottery 130 may transmit the result of the provisional lottery showing the game content drawn in the step S806 to the terminal device 20 of the user specified in the step S802 (refer to T2 of FIG. 8). In other words, the module for processing the lottery 130 may notify the game content drawn in the step S806 to the user and may inquire whether or not the user wishes to redraw.

In a step S816, the module for processing the lottery 130 may determine whether or not a response corresponding to the result of the provisional lottery transmitted in the step S814 has been received from the terminal device 20 of the user specified in the step S802. In other words, the module for processing the lottery 130 may determine whether or not the response corresponding to the request of the redrawing has been received. The process may proceed to a step S818 if the result of the determination is "YES" and, in other cases, the process may be in the state of waiting to receive the response corresponding to the request of the redrawing.

In the step S818, the module for processing the lottery 130 may determine whether or not the user specified in the step S802 wishes to redraw based on the response obtained in the step S816. The process may proceed to a step S820 if the result of the determination is "YES" and, in other cases, the process may proceed to a step S830.

In the step S820, the module for executing redrawing 133 of the module for processing the lottery 130 may set up the redrawing target group. As an example herein, the redrawing target group may be configured by extracting all game content with the rarity SSR except the game content drawn in the step S806 from the current lottery target group.

In a step S822, the module for executing redrawing 133 of the module for processing the lottery 130 may execute the redrawing processing. Specifically, the module for executing redrawing 133 may draw the game content of the game system from the lottery target group set in the step S820.

In a step S824, the module for executing redrawing 133 of the module for processing the lottery 130 may transmit the result of the lottery showing the game content drawn in the step S822 to the terminal device 20 of the user specified in the step S802 (refer to T4 in FIG. 8).

In a step S826, the module for processing the lottery 130 may store the result of the lottery showing the game content drawn in the step S822 into the lottery result recording area temporary.

In the step S828, the module for processing the lottery 130 may transmit the result of the lottery showing the game content drawn in the step S806 to the terminal device 20 of the user specified in the step S802.

In the step S830, the module for processing the lottery 130 may store the result of the lottery showing the game content drawn in the step S806 into the lottery result recording area temporary.

In a step S832, the module for processing the lottery 130 may determine whether or not N equals to NMAX (that is, N equals M). The process may proceed to a step S834 if the result of the determination is "YES" and, in other cases, the process may proceed to a step S836.

In the step S834, the module for producing a lottery result 134 of the module for processing the lottery 130 finalizes the result of the lottery stored in the lottery result recording area. In other words, the module for producing a lottery result 134 may update the information pertaining to the owned game content associated with the user specified in the step S802 (refer to FIGS. 2 and 3) based on the result of the lottery stored in the lottery result recording area. Herewith, the owned game contents of the user may increase.

In the step S836, the module for processing the lottery 130 increments N by "1."

In a step S838, the module for executing a normal lottery 131 of the module for processing the lottery 130 may reset the lottery target group for the normal lottery. As an example herein, the lottery target group may be set up by excluding the game contents corresponding to the recent lottery result (including the result of the lottery by the redrawing processing) from the current lottery target group (which may not be the same as redrawing target group).

According to an operation in FIG. 10, the process may proceed to the step S822 when the rarity of the game content drawn in the lottery processing in the step S806 is SSR and the user already owns the game content drawn in the lottery processing in the step S806. Further, if the redrawing is executed in the step S822 according to a wish of the user, it may be possible that the game content with the rarity SSR other than the game content drawn in the lottery processing in the step S806 can be given to the user. As a result, it may be possible for the user to obtain the higher value game content for the user (another game content with the rarity SSR) than the game content drawn in the lottery processing in the step S806. In other words, an absolute value may be the same as the game content drawn in the lottery processing in the step S806, however, it may be possible for the user to obtain the game content that may be a higher demand for the user (another game content with the rarity SSR).

In an operation shown in FIG. 10, regarding the game content drawn in the redrawing processing in the step S822, a success or a failure of the redrawing conditions may not be determined, however, it may not be limited thereto. For example, the similar determination whether the redrawing conditions may be successful or unsuccessful may be performed for the game content drawn in the redrawing processing. Such a modification may apply to FIGS. 11 and 12 described later in the same manner.

Further, in an operation shown in FIG. 10, in each normal lottery processing of NMAX (the number of the raffle may be M) respectively, an operation may be executed to proceed to the step S814 to the step S826 if the result of the determination in the step S812 may be "YES," however, it may not be limited thereto. For example, after executing all of NMAX (the number of raffles may be M) normal lottery processing, whether or not the redrawing conditions may be satisfied may be determined with regard to each of the normal lottery processing respectively. Such a modification may apply to FIGS. 11 and 12 described later in the same manner.

In addition, in an operation shown in FIG. 10, the maximum redrawing processing may be executed more than twice if NMAX (the number of raffles may be M) is more than two, however, in order to reduce the load of the redrawing processing, the number of the possible execution of the redrawing processing may be set to limit to less than NMAX. For example, the number of the possible execution of the redrawing processing may be set to a limit of only once. Such a modification may apply to FIGS. 11 and 12 described later in the same manner.

Figure 11:
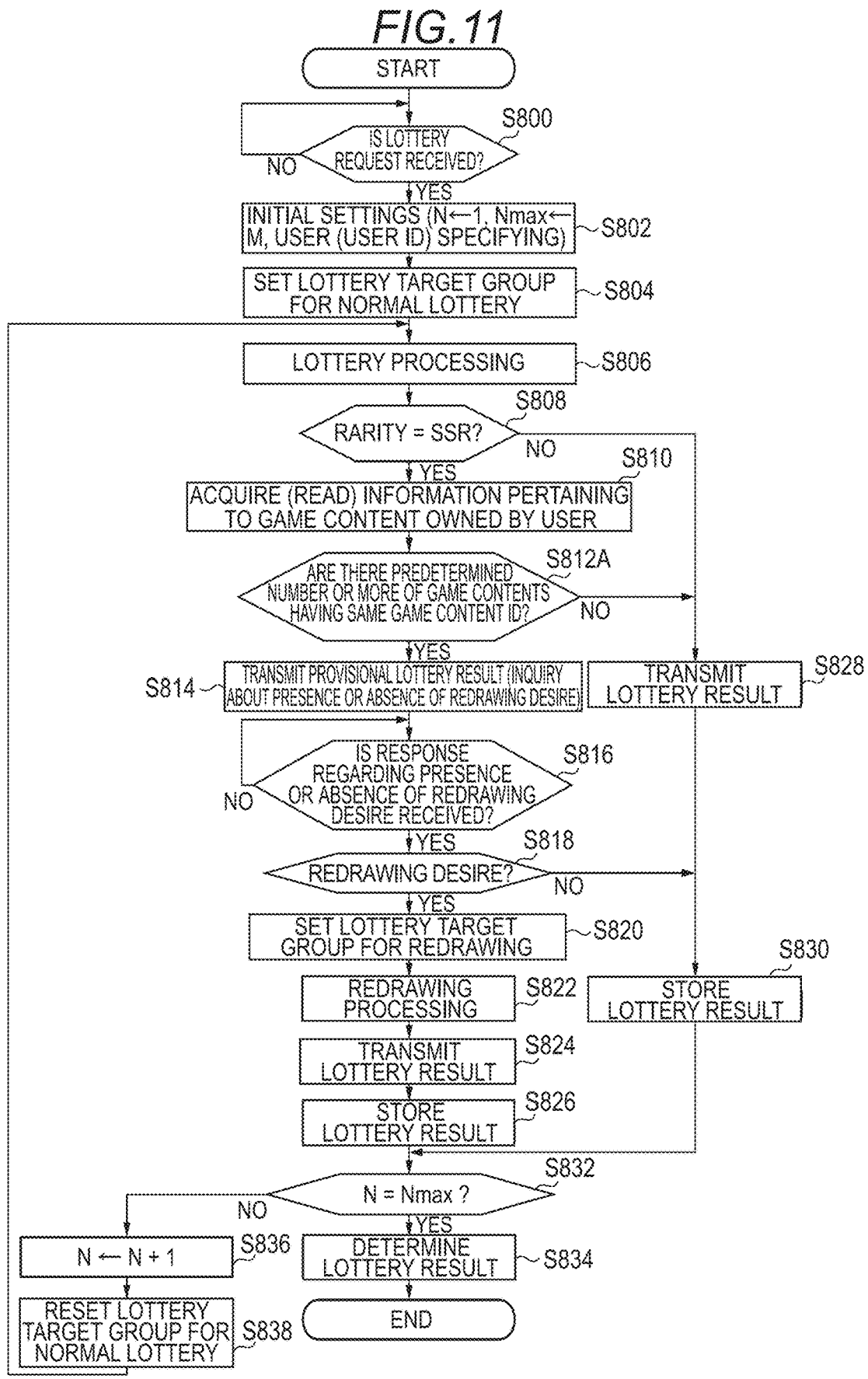
FIG. 11 is a schematic flowchart showing another example of processing executed by a module for processing a lottery.

FIG. 11 may be a schematic flowchart showing another example of processing executed by the module for processing the lottery 130 in the server control module 13.

In view of a different aspect with respect to an operation shown in FIG. 10, in an operation shown in FIG. 11, the step S812 may be replaced with a step S812A.

In the step S812A, the module for determining a redrawing condition 132 of the module for processing the lottery 130 may determine whether or not the game content drawn in the step S806 may be already owned by the user specified in the step S802 more than the predetermined number Nth based on the information pertaining to the owned game content obtained in the step S810. In other words, the module for determining a redrawing condition 132 may determine whether or not the foregoing condition (2A) has established. The predetermined number Nth may be as described above. The process may proceed to the step S814 if the result of the determination is "YES" and, in other cases, the process may proceed to the step S828.

The similar result may be achieved in an operation shown in FIG. 11 as an operation shown in FIG. 10. Especially, according to an operation shown in FIG. 11, since the possibility of satisfying the redrawing conditions may be lower than an operation shown in FIG. 10, the amount of the load on the server computer may be reduced.

FIG. 12 may be a schematic flowchart showing yet another example of processing executed by the module for processing the lottery 130 in the server control module 13.

In view of different aspects with respect to an operation shown in FIG. 10, in an operation shown in FIG. 12, the step S808 may be replaced with a step S808A and further, a step S813 may be added.

In the step S808A, the module for determining a redrawing condition 132 of the module for processing the lottery 130 may determine whether or not the higher rarity than the predetermined standard may be correlated to the game content drawn in the step S806. As an example herein, the module for determining a redrawing condition 132 may determine whether or not the rarity of the game content drawn in the step S806 may be more than SR (that is, the rarity may be SR or SSR) as the foregoing condition (1C). The process may proceed to the step S810 if the result of the determination is "YES" and, in other cases, the process may proceed to the step S828.

In FIG. 12, the process may proceed to the step S813 if the result of the determination is "YES" in the step S812.

In the step S813, the module for determining a redrawing condition 132 of the module for processing the lottery 130 may determine whether or not the owned game content which may be the same as the game content drawn in the step S806 has reached the upper limit of evolution. In other words, if the rarity of the game content drawn in the step S806 is SR, the module for determining a redrawing condition 132 may determine whether or not the foregoing condition (2B) has established according to the combination of the step S812 and the step S813. If the rarity of the game content drawn in the step S806 may be SSR, the step S813 may be omitted. The process may proceed to the step S814 if the result of the determination is "YES" and, in other cases, the process may proceed to the step S828.

The similar result may be achieved in an operation shown in FIG. 12 as an operation shown in FIG. 10. Especially, according to an operation shown in FIG. 12, since the possibility of satisfying the redrawing conditions may be lower than an operation shown in FIG. 10, the amount of the load on the server computer may be reduced.

Each of the foregoing embodiments has been described in detail, however, it may not be limited to a specific embodiment, and various modifications and may change may be possible within the range described in the claims. Further, it may be possible to combine all or multiple components of the foregoing embodiments.

For example, in the foregoing embodiments, the configuration may be such that the terminal device 20 may execute a part or all of the operations and an operation executed by the server device 10. Similarly, the configuration may be such that the server device 10 may execute a part of the operations executed by the terminal device 20. For example, the display control of each screen displayed on the terminal device 20 and an operation such as each GUI control may be executed by one of the server device 10 or the terminal device 20 or may be executed by both the server device 10 and the terminal device 20 collaborating with each other. Alternatively, the game system may not have to have the server device 10. In such a case, in the foregoing embodiment, the terminal device 20 may store the information receiving from the server device 10 in advance.

Further, in the foregoing embodiments, at least a part of the screen displayed on the terminal device 20 may be a web display shown on the terminal device 20 based on the data generated by the server device 10, and at least a part of the screen may be a native display shown by the native application installed in the terminal device 20. In such a case, games according to the foregoing embodiment may be hybrid games in which the server device 10 and the terminal device 20 may each take a part of an operation respectively.

Furthermore, in order to function as the server device 10 or the terminal device 20 according to the foregoing embodiment, an information processing device such as a computer or a mobile phone may be suitably used. Such an information processing device may store the program in which an operation substance may be described in order to achieve each function of the server device 10 or the terminal device 20 according to an exemplary embodiment into the storage module of the information processing device, and it may be possible to accomplish by reading and executing the program with CPU which may be an information processing device.

In addition, in the foregoing embodiments, the example of the first game content and the second game content being different game contents was described. However, the first game content and the second game content may be the same game content, for example.

Related to the foregoing embodiment, supplementary descriptions may be further disclosed as the following.

As Supplementary Description 1, a game device may be provided with a storage module that may store game content information indicating one or more game contents associated with user identification information for each user identification information; and a module for processing a lottery that newly associates a game content drawn from multiple types of game contents with the user identification information on the basis of lottery processing for each user identification information. The multiple types of game contents may be associated with an index value corresponding to a relative value between the multiple types of game contents, respectively. The module for processing a lottery may include a module for executing redrawing that may execute new lottery processing for drawing a different type of game content from the game content drawn by the lottery processing of the game system when the game content drawn by the lottery processing of the game system related to a user identification information of the game system may be associated with the index value indicating a high value equal to or higher than a predetermined standard, and the game content drawn by the lottery processing of the game system may include a predetermined relationship with respect to the game content information related to the user identification information of the game system. The module for processing a lottery may further include a game content changing module that may associate the game content drawn by the new lottery processing instead of the game content drawn by the lottery processing of the game system with the user identification information of the game system when the new lottery processing is executed by the module for executing redrawing.

As Supplementary Description 2, the game device according to the supplementary description 1 may have an index value that includes a degree of rarity of each of the multiple types of game contents, with the index value indicating the high value equal to or higher than the predetermined standard may include a degree of rarity equal to or higher than a predetermined standard.

As Supplementary Description 3, the game device according to the supplementary description 1 or 2 may have an index value that includes a parameter indicating an ability of each of the multiple types of game contents; with the index value indicating the high value equal to or higher than the predetermined standard may include the parameter indicating an ability equal to or higher than a predetermined standard.

As Supplementary Description 4, the game device according to any one of the supplementary descriptions 1 to 3 may have a predetermined relationship which includes a relation in which the game content drawn by the lottery processing of the game system is the same type as game content included in the game content information related to the user identification information of the game system.

As Supplementary Description 5, the game device according to any one of the supplementary descriptions 1 to 3 may have a configuration in which it may be possible for the game content to be associated with a plurality of pieces of the same user identification information even though the plurality of pieces of the same user identification information may be the same type. The predetermined relation may include a relation in which the game content drawn by the lottery processing of the game system may be the same type as a predetermined number or more of game contents included in the game content information related to the user identification information of the game system.

As Supplementary Description 6, the game device according to any one of the supplementary descriptions 1 to 3 may have a configuration in which at least one of the multiple types of game contents may be allowed to be changed to an upper limit stepwise with consumption of a predetermined type of associated game content; and the predetermined relation may include a relation in which the game content drawn by the lottery processing of the game system may be identical to a game content changed to the upper limit and included in the game content information related to the user identification information of the game system or a relation in which the game content drawn by the lottery processing of the game system may be the predetermined type of the game content associated only with the changed game content.

As Supplementary Description 7, the game device according to any one of the supplementary descriptions 1 to 6 may have a configuration in which the lottery processing of the game system includes processing of drawing a game content of a game system from among multiple types of game contents of a first group; the new lottery processing includes processing of drawing a game content of a game system from multiple types of game contents of a second group; and the multiple types of game contents of the second group do not include a type of game content associated with the index value indicating a value lower than the game content drawn by the lottery processing of the game system among the multiple types of game contents of the first group but may include a type of game content associated with the same index value as the game content drawn by the lottery processing of the game system.

As Supplementary Description 8, the game device according to the supplementary description 7, may have a configuration in which the multiple types of the game contents of the second group may be configured by extracting a type of a game content associated with the same index value as the game content drawn by the lottery processing of the game system from among the multiple types of the game contents of the first group excluding the game content drawn by the lottery processing of the game system.

As Supplementary Description 9, a game method executed by a computer may include steps of: execution of a lottery processing of a game system related to user identification information of the game system from among multiple types of game contents associated with an index value corresponding to a relative value; retrieval of game content information related to the user identification information of the game system from a storage module that may store game content information indicating one or more game contents associated with user identification information for each user identification information; execution of new lottery processing for drawing a different type of game content from the game content drawn by the lottery processing of the game system when the game content drawn by the lottery processing of the game system is associated with the index value indicating a high value equal to or higher than a predetermined standard, and the game content drawn by the lottery processing of the game system has a predetermined relationship with respect to the game content information related to the user identification information of the game system; and correlation of the game content drawn by the new lottery processing instead of the game content drawn by the lottery processing of the game system with the user identification information of the game system when the new lottery processing is executed.

As Supplementary Description 10, a game program may operate a computer to execute processes of: executing a lottery processing of a game system related to user identification information of the game system from among multiple types of game contents associated with an index value corresponding to a relative value; retrieving game content information related to the user identification information of the game system from a storage module that may store game content information indicating one or more game contents associated with user identification information for each user identification information; executing new lottery processing for drawing a different type of game content from the game content drawn by the lottery processing of the game system when the game content drawn by the lottery processing of the game system is associated with the index value indicating a high value equal to or higher than a predetermined standard, and the game content drawn by the lottery processing of the game system has a predetermined relation with respect to the game content information related to the user identification information of the game system; and associating the game content drawn by the new lottery processing instead of the game content drawn by the lottery processing of the game system with the user identification information of the game system when the new lottery processing is executed.

DESCRIPTION OF REFERENCE NUMERALS

1 Game System
10 Server Device
11 Server Communication Module
12 Server Storage Module
13 Server Control Module
20 Terminal Device
21 Terminal Communication Module
22 Terminal Storage Module
23 Display Module
24 Input Module
25 Terminal Control Module
30 Network
40 Movable Object
41 Road Surface
42 Item
130 Module for Processing a Lottery
131 Module for Executing a Normal Lottery
132 Module for Determining a Redrawing Condition
133 Module for Executing Redrawing
134 Module for Producing a Lottery Result

What is claimed is:

1. A game device, comprising:
a graphical user interface;
a storage memory configured to store game content information indicating one or more game contents; and
a processor configured to execute computer program code for processing a lottery, comprising:
executing one or more first lottery processes and determining a game content resulting from each of the one or more first lottery processes, wherein said game content is drawn from multiple types of game contents,
newly presenting the game content to a user based on lottery processing, comprising providing, to the user, on the graphical user interface, a visualization of the game content;
determining whether a redrawing condition is met, and, upon determination that the redrawing condition is met, providing, to the user, on the graphical user interface, simultaneously with the visualization of the game content, a user dialog comprising a redraw triggering element;
receiving, from the user, a selection of the redraw triggering element, and based on the selection of the redraw triggering element, executing new lottery processing for drawing a different type of game content from the game content drawn by a first lottery process, wherein redrawing comprises:
for each first lottery process in the one or more first lottery processes, by the module for executing redrawing, determining whether a value of the game content drawn by the first lottery process meets a predetermined standard, and
upon determination that, in the first lottery process in the one or more first lottery processes, the game content drawn by the first lottery process meets the predetermined standard, triggering the new lottery processing; and
associating the game content drawn by the new lottery processing instead of the game content drawn by the first lottery process with the user when the new lottery processing is executed by the module for executing redrawing.

2. The game device according to claim 1, wherein providing, to the user, on the graphical user interface, the visualization of the game content comprises presenting, on a character screen, a character graphic, further comprises retrieving and presenting message text associated with the redrawing condition comprising at least a rarity value of the game content.

3. The game device according to claim 1, wherein creating the user dialog comprising the redraw triggering element comprises providing, on the graphical user interface, a plurality of touch switches, a first touch switch in the plurality of touch switches configured to provide selection of the redraw triggering element and a second touch switch in the plurality of touch switches configured to reject selection of the redraw triggering element.

4. The game device according to claim 1, wherein determining that the redrawing condition is met comprises determining that a rarity of the game content is equal to or higher than a predetermined rarity value.

5. The game device according to claim 4, wherein the processor is configured to execute the first lottery process by:
    determining, based on the game content information stored in the storage memory, a number of available game contents at each of a set of predetermined rarity values;
    for each predetermined rarity value, determining a probability of providing a game content having the predetermined rarity value, and adjusting, based on the number of available game contents at the predetermined rarity value, a probability of providing each particular game content having the predetermined rarity value; and
    performing selection based on the probability of providing each particular game content.

6. The game device according to claim 5, wherein selection comprises random selection performed based on one of:
    randomly drawing, from a lottery target group, the game content having the predetermined rarity value, and, based on drawing of the game content having the predetermined rarity value, removing the game content having the predetermined rarity value from the lottery target group; and
    randomly drawing, from the lottery target group, the game content having the predetermined rarity value, and, based on the drawing of the game content having the predetermined rarity value, maintaining the lottery target group as including the game content having the predetermined rarity value.

7. The game device according to claim 4, wherein triggering the new lottery processing further comprises providing a redrawing target group by at least one of:
    removing, from a pool of game content to be selected by the new lottery processing, game content having a rarity lower than a threshold, and designating the pool of game content as the redrawing target group; and
    designating a new pool of game content as the redrawing target group.

8. The game device according to claim 1, wherein determining that the redrawing condition is met comprises determining that each of two conditions is met, a first condition being that a rarity of the game content is equal to or higher than a predetermined rarity value and a second condition being that the game content meets an additional standard simultaneously with the rarity of the game content being equal to or higher than the predetermined rarity value.

9. The game device according to claim 1, wherein determining whether the redrawing condition is met comprises comparing an ability parameter of the game content to a predetermined ability parameter.

10. The game device according to claim 1, wherein determining whether the redrawing condition is met comprises determining that a game content ID of the game content is within a predetermined group.

11. The game device according to claim 10, wherein the predetermined group is a set of game contents in which at least one game content in the set is evolvable into at least one other game content in the set.

12. The game device according to claim 11, wherein each of the game contents in the set comprises a same type of game content at one of a plurality of stages of evolution, said stages of evolution including at least a first stage game content and a second stage game content related to the first stage game content and having at least one ability parameter value higher than an equivalent ability parameter value for the first stage game content.

13. The game device according to claim 11, wherein at least one game content in the plurality of game contents is changeable based on consumption of one or more game contents meeting a predetermined evolution cost.

14. The game device according to claim 13, wherein the storage memory is further configured to store a number of game contents needed to change the at least one game content in the plurality of game contents to an upper limit of change of the at least one game content, wherein the storage memory is further configured to set a predetermined threshold for a number of owned game contents, and wherein determining that the redrawing condition is met comprises determining that a number of game contents stored in association with the user is greater than the predetermined threshold.

15. The game device according to claim 1, wherein the storage memory is further configured to store past game content information indicating one or more game contents previously owned by the user, and wherein determining whether the redrawing condition is met comprises determining whether the game content is recorded in the past game content information or whether the game content is not recorded in the past game content information.

16. The game device according to claim 1, wherein triggering the one or more first lottery processes comprises removing, from the storage memory, one or more predetermined game contents stored in the game content information, said one or more predetermined game contents selected from at least one of: a point, a virtual currency, one or more tickets, and one or more items; and
    initiating the one or more first lottery processes as a result of removing the one or more predetermined game contents.

17. The game device according to claim 1, wherein triggering the one or more first lottery processes comprises:
    obtaining a current time value, and comparing the current time value to predetermined schedule information, said predetermined schedule information comprising at least one campaign;
    triggering the one or more first lottery processes without removing, from a profile associated with the user, one or more predetermined game contents stored in association with the user when the current time value is a time of the at least one campaign, said one or more predetermined game contents selected from at least one of: a point value, a virtual currency, one or more game tickets, and one or more game items; and
    triggering the one or more first lottery processes and removing, from the profile associated with the user, the one or more predetermined game contents stored in association with the user when the current time value is not the time of the at least one campaign.

18. The game device according to claim 1, wherein triggering the one or more first lottery processes comprises:
   determining, from a profile associated with the user, whether the user has an initial registration status;
   triggering the one or more first lottery processes without removing, from a profile associated with the user, one or more predetermined game contents stored in association with the user when the user has the initial registration status, said one or more predetermined game contents selected from at least one of: a point value, a virtual currency, one or more game tickets, and one or more game items; and
   triggering the one or more first lottery processes and removing, from the profile associated with the user, the one or more predetermined game contents stored in association with the user when the user does not have the initial registration status.

19. A game method executed by a computer, comprising:
   executing, with a processor, one or more first lottery processes and determining, by accessing a storage memory configured to store game content information indicating one or more game contents, a game content resulting from each of the one or more first lottery processes, wherein said game content is drawn from multiple types of game contents,
   newly presenting the game content to a user based on lottery processing, comprising providing, to the user, on the graphical user interface, a visualization of the game content;
   determining whether a redrawing condition is met, and, upon determination that the redrawing condition is met, providing, to the user, on the graphical user interface, simultaneously with the visualization of the game content, a user dialog comprising a redraw triggering element;
   receiving, from the user, a selection of the redraw triggering element, and based on the selection of the redraw triggering element, executing new lottery processing for drawing a different type of game content from the game content drawn by a first lottery process, wherein redrawing comprises:
      for each first lottery process in the one or more first lottery processes, by the module for executing redrawing, determining whether a value of the game content drawn by the first lottery process meets a predetermined standard, and
      upon determination that, in the first lottery process in the one or more first lottery processes, the game content drawn by the first lottery process meets the predetermined standard, triggering the new lottery processing; and
   associating the game content drawn by the new lottery processing instead of the game content drawn by the first lottery process with the user when the new lottery processing is executed by the module for executing redrawing.

20. A non-transitory computer-readable medium on which is embodied game program instructions that, when executed, cause a computer comprising a processor, a storage memory, and a graphical user interface to execute steps of:
   executing one or more first lottery processes and determining a game content resulting from each of the one or more first lottery processes, wherein said game content is drawn from multiple types of game contents,
   newly presenting the game content to a user based on lottery processing, comprising providing, to the user, on the graphical user interface, a visualization of the game content;
   determining whether a redrawing condition is met, and, upon determination that the redrawing condition is met, providing, to the user, on the graphical user interface, simultaneously with the visualization of the game content, a user dialog comprising a redraw triggering element;
   receiving, from the user, a selection of the redraw triggering element, and based on the selection of the redraw triggering element, executing new lottery processing for drawing a different type of game content from the game content drawn by a first lottery process, wherein redrawing comprises:
      for each first lottery process in the one or more first lottery processes, by the module for executing redrawing, determining whether a value of the game content drawn by the first lottery process meets a predetermined standard, and
      upon determination that, in the first lottery process in the one or more first lottery processes, the game content drawn by the first lottery process meets the predetermined standard, triggering the new lottery processing; and
   associating the game content drawn by the new lottery processing instead of the game content drawn by the first lottery process with the user when the new lottery processing is executed by the module for executing redrawing.

* * * * *